US012779444B2

(12) United States Patent
Grubert et al.

(10) Patent No.: US 12,779,444 B2
(45) Date of Patent: Nov. 3, 2026

(54) THREE-WAY DIESEL CATALYST FOR COLD START TECHNOLOGY

(71) Applicant: BASF Mobile Emissions Catalysts LLC, Iselin, NJ (US)

(72) Inventors: Gerd Grubert, Hannover (DE); Arne Tobias Niggebaum, Hannover (DE); Sven Jare Lohmeier, Hannover (DE); Torsten Neubauer, Hannover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 759 days.

(21) Appl. No.: 18/033,863

(22) PCT Filed: Oct. 28, 2021

(86) PCT No.: PCT/EP2021/080011
§ 371 (c)(1),
(2) Date: Apr. 26, 2023

(87) PCT Pub. No.: WO2022/090404
PCT Pub. Date: May 5, 2022

(65) Prior Publication Data

US 2023/0398532 A1 Dec. 14, 2023

(30) Foreign Application Priority Data

Oct. 29, 2020 (EP) .................................... 20204574

(51) Int. Cl.
*B01J 37/00* (2006.01)
*B01D 53/94* (2006.01)
(Continued)

(52) U.S. Cl.
CPC ........ *B01J 37/0244* (2013.01); *B01D 53/945* (2013.01); *B01D 53/9481* (2013.01);
(Continued)

(58) Field of Classification Search
CPC ...... B01J 37/0224; B01J 35/19; B01J 35/635; B01J 6/001; B01J 20/08; B01J 23/63;
(Continued)

(56) References Cited

U.S. PATENT DOCUMENTS

2016/0067690 A1 3/2016 Sato et al.
2016/0184803 A1 6/2016 Umeno et al.
2018/0071679 A1 3/2018 Karpov et al.

FOREIGN PATENT DOCUMENTS

CN 102 716 733 A 10/2001
CN 1 868 584 A 11/2006
(Continued)

OTHER PUBLICATIONS

International Search Report and Written Opinion from corresponding PCT International Appln. No. PCT/EP2021/080011 dated May 5, 2022.

(Continued)

*Primary Examiner* — James E Mcdonough
(74) *Attorney, Agent, or Firm* — DLA Piper LLP (US)

(57) ABSTRACT

The present invention relates to a catalyst, in particular to a three-way diesel catalyst, for the treatment of a diesel exhaust gas, the catalyst comprising a substrate and two specific coatings disposed thereon, wherein the first coating particularly comprises a first platinum group metal component supported on a first oxidic support material, a second platinum group metal component supported on a second oxidic support material, and a first oxygen storage component, wherein at least 30 weight-% of the first oxygen storage component consist of cerium oxide, calculated as CeOa, and wherein the second coating particularly comprises a third platinum group metal component and a fourth platinum group metal component, wherein the third platinum group metal component and the fourth platinum group metal component are supported on a third oxidic support (Continued)

material. Further, a process for the preparation of such a catalyst is disclosed as well as a use thereof.

16 Claims, 4 Drawing Sheets

(51) Int. Cl.

| | |
|---|---|
| ***B01J 6/00*** | (2006.01) |
| ***B01J 20/08*** | (2006.01) |
| ***B01J 23/63*** | (2006.01) |
| ***B01J 29/70*** | (2006.01) |
| ***B01J 35/00*** | (2006.01) |
| ***B01J 35/63*** | (2024.01) |
| ***B01J 37/02*** | (2006.01) |
| ***F01N 3/10*** | (2006.01) |
| *B01J 21/04* | (2006.01) |
| *B01J 35/61* | (2024.01) |

(52) U.S. Cl.
CPC ............... *B01J 6/001* (2013.01); *B01J 20/08* (2013.01); *B01J 23/63* (2013.01); *B01J 29/70* (2013.01); *B01J 35/19* (2024.01); *B01J 35/635* (2024.01); *F01N 3/101* (2013.01); *B01J 21/04* (2013.01); *B01J 35/615* (2024.01); *F01N 2510/0684* (2013.01); *F01N 2570/14* (2013.01)

(58) Field of Classification Search
CPC .......... B01J 29/70; B01J 35/615; B01J 21/04; B01D 53/945; B01D 53/9481; F01N 3/101; F01N 2510/0684; F01N 2570/14
USPC .......................................................... 502/332
See application file for complete search history.

(56) References Cited

FOREIGN PATENT DOCUMENTS

| | | | | |
|---|---|---|---|---|
| EP | 0 904 482 B2 | 1/2010 | | |
| EP | 3 170 553 A1 | 5/2017 | | |
| EP | 3170553 A2 * | 5/2017 | .......... | F01N 3/0842 |
| JP | 2001-106527 A | 4/2001 | | |
| JP | 2013146693 A | 8/2013 | | |
| JP | 2018-513781 A | 5/2018 | | |
| WO | 95/35152 A1 | 12/1995 | | |
| WO | 2014/116897 A1 | 7/2014 | | |
| WO | 2015005342 A1 | 1/2015 | | |

OTHER PUBLICATIONS

Extended European Search Report dated Apr. 23, 2021, of counterpart European Patent Application No. 20204574.6.
International Preliminary Report on Patentability and Written Opinion from corresponding PCT International Appln. No. PCT/EP2021/080011 dated May 11, 2023.

* cited by examiner

THREE-WAY DIESEL CATALYST FOR COLD START TECHNOLOGY

TECHNICAL FIELD

The present invention relates to a catalyst for the treatment of a diesel exhaust gas, the catalyst comprising a substrate and two specific coatings disposed thereon, wherein the first coating particularly comprises two platinum group metal components each supported on an oxidic support material, and a specific oxygen storage compound, wherein at least 30 weight-% of said oxygen storage compound consist of cerium oxide, calculated as $CeO_2$, and wherein the second coating particularly comprises two platinum group metal components both supported on a further oxidic support material. Further, the present invention relates to a process for the preparation of such a catalyst.

INTRODUCTION

In automotive industry, there is an ongoing need to reduce engine NOx emissions as these emissions can be harmful. Thus, there is an interest for avoiding NOx emissions and to cope with present regulations. A particular focus of current research and development lies in the reduction of NOx emissions generated during the cold-start period, especially since the temperature for the NOx conversion in the catalytic system at that time is usually comparatively low. Thus, it is an object of the present invention to reduce the overall NOx emissions, and in particular to improve NOx adsorption and conversion during the cold-start period, i. e. in particular at temperatures below 300° C. post turbo charger temperatures.

During the cold-start period, in comparison with the subsequent driving mode, the SCR light-off typically starts at temperatures between 180 to 200° C., which can be considered as pre SCR temperatures. For cold engines, SCR light-off usually starts after 6 to 10 km of driving, for example in city driving. Especially with respect to the upcoming Euro7 legislation, it can be expected that NOx needs to be converted already during the cold-start period to fulfill the NOx emissions targets.

A heating method—particularly suitable for saving $CO_2$— to achieve an early SCR light-off typically includes adjusting the Lambda of the engine combustion to around 1. Said condition may be considered also as three-way diesel catalyst-like conditions. In accordance with the present invention, a condition where Lambda is 1 can also be designated as Lambda=1 conditions. However, under Lambda=1 conditions the diesel engine usually emits comparatively high amounts of CO, and total hydrocarbons (THC) which need to be converted. Furthermore, Lambda=1 conditions cannot be applied on a typical engine directly after the cold start. Usually, it takes around 50 to 100 seconds to reach stable Lambda=1 conditions. Thus, a NOx release upon starting conditions including Lambda=1 should be avoided accordingly.

EP 0904482 B2 relates to a purification apparatus of an exhaust gas which is discharged or emitted from an internal combustion engine. It is disclosed that the exhaust gas purification apparatus comprises catalyst components supported on a carrier body, wherein said catalyst components comprise at least one of alkali metals, at least one of alkaline earth metals other than barium, at least one of titanium and silicon, and at least one of noble metals. EP 3170553 A2 relates to a multi-zone catalytic converter, in particular to an exhaust gas treatment article. WO 95/35152 A1 relates to a layered catalyst composite comprising two layers. WO 2014/116897 A1 relates to automotive catalyst composites having a two-metal layer. US 2016/0067690 A1 relates to an exhaust gas purification catalyst and production method thereof.

Thus, there is a need for a three-way diesel catalyst, in particular as a possible solution for a first catalyst matching the upcoming Euro7 legislation, which is particularly suitable for mass production.

DETAILED DESCRIPTION

It was therefore an object of the present invention to provide an improved catalyst, preferably a three-way diesel catalyst, for the treatment of a diesel exhaust gas, the catalyst exhibiting in particular an improved performance with respect to the conversion of one or more of NOx, CO, and total hydrocarbons (THC), especially during the cold start period of a diesel engine, and especially in a period under conditions before Lambda=1 is reached and/or in a period under Lambda=1 conditions. Further, it was an object of the present invention to provide a process for the preparation of such a catalyst.

Thus, it was surprisingly found that a catalyst, which particularly can be seen as a three-way diesel catalyst, for the treatment of a diesel exhaust gas can solve one or more of the above mentioned problems, in particular with respect to an improved performance with respect to the conversion of one or more of NOx, CO, and total hydrocarbons (THC), wherein the catalyst combines a diesel oxidation catalyst function and a three-way diesel catalyst function. Thus, it was found that an improved catalyst for the treatment of a diesel exhaust gas can be provided in particular comprising two specific coatings, wherein the first (bottom) coating comprises a specific oxygen storage material. It has been surprisingly been found that both of said functions together can convert CO, Hydrocarbons and NOx, in particular during Lambda=1 conditions. Surprisingly, the catalyst of the present invention thus permits for an improved catalytic activity. Also, the catalyst of the present invention shows an excellent behavior as concerns NOx release and NOx adsorption, in particular during one or more of the cold start period, before reaching Lambda=1 conditions, and during Lambda=1 conditions.

Therefore, the present invention relates to a catalyst, preferably a three-way diesel catalyst, for the treatment of a diesel exhaust gas, the catalyst comprising (i) a substrate comprising an inlet end, an outlet end, a substrate axial length extending from the inlet end to the outlet end of the substrate and a plurality of passages defined by internal walls of the substrate extending therethrough;

(ii) a first coating disposed on the surface of the internal walls of the substrate and extending over at least 50% of the axial length of the substrate from the inlet end toward the outlet end, wherein the first coating comprises a first platinum group metal component supported on a first oxidic support material, a second platinum group metal component supported on a second oxidic support material, wherein the first platinum group metal component is different to the second platinum group metal component, and a first oxygen storage compound, wherein at least 30 weight-% of the first oxygen storage compound consist of cerium oxide, calculated as $CeO_2$; and (iii) a second coating extending over at least 50% of the axial length of the substrate from the outlet end toward the inlet end and disposed either on the surface of the internal walls of the substrate, or on the surface of the internal walls of the substrate and the first coating, or on the first coating, wherein the second coating comprises a third platinum group metal component and a fourth platinum group metal component, wherein the third platinum group metal component and the fourth platinum group metal component are supported on a third oxidic support material, and wherein the third platinum group metal component is different to the fourth platinum group metal component.

Preferably, the present invention relates to a catalyst for the treatment of a diesel exhaust gas, the catalyst comprising (i) a substrate comprising an inlet end, an outlet end, a substrate axial length extending from the inlet end to the outlet end and a plurality of passages defined by internal walls of the substrate extending therethrough;

(ii) a first coating disposed on the surface of the internal walls of the substrate and extending over at least 55% of the axial length of the substrate from the inlet end toward the outlet end, the first coating comprising a first platinum group metal component supported on a first oxidic support material, a second platinum group metal component supported on a second oxidic support material, wherein the first platinum group metal component is different to the second platinum group metal component, and a first oxygen storage compound, wherein at least 30 weight-% of the first oxygen storage compound consist of cerium oxide, calculated as $CeO_2$; and (iii) a second coating at least partially disposed on the first coating and extending over at least 55% of the axial length of the substrate from the outlet end toward the inlet end, the second coating comprising a third platinum group metal component and a fourth platinum group metal component, wherein the third platinum group metal component and the fourth platinum group metal component are supported on a third oxidic support material, and wherein the third platinum group metal component is different to the fourth platinum group metal component.

It is preferred that the substrate according to (i) of the catalyst comprises, more preferably consists of, a ceramic and/or a metallic substance, more preferably a ceramic substance, more preferably a ceramic substance which is one or more of alumina, silica, silicate, aluminosilicate, aluminotitanate, silicon carbide, cordierite, mullite, zirconia, spinel, magnesia, and titania, more preferably one or more of alpha-alumina, aluminotitanate, silicon carbide, and cordierite, more preferably one or more of aluminotitanate, silicon carbide, and cordierite, wherein more preferably the substrate comprises cordierite, more preferably consists of cordierite.

It is preferred that the substrate according to (i) of the catalyst is a monolith, more preferably a honeycomb monolith, wherein the honeycomb monolith is more preferably a wall-flow or flow-through monolith, more preferably a flow-through monolith.

It is preferred that the substrate according to (i) of the catalyst has a total volume in the range of from 0.1 to 4 l, more preferably in the range of from 0.20 to 2.5 l, more preferably in the range of from 0.30 to 2.1 l, more preferably in the range of from 1.0 to 2.1 l.

It is preferred that the first coating according to (ii) of the catalyst extends from 50 to 100%, more preferably from 55 to 100%, more preferably from 60 to 100%, more preferably from 65 to 100%, of the axial length of the substrate from the inlet end toward the outlet end.

It is preferred that the first coating according to (ii) of the catalyst extends from 95 to 100%, more preferably from 98 to 100%, more preferably from 99 to 100%, of the axial length of the substrate from the inlet end toward the outlet end.

It is preferred that the first coating according to (ii) of the catalyst extends from 65 to 90%, more preferably from 65 to 80%, more preferably from 65 to 75%, of the axial length of the substrate from the inlet end toward the outlet end.

It is preferred that from 30 to 90 weight-%, more preferably from 32 to 80 weight-%, more preferably from 35 to 70 weight-%, more preferably from 40 to 55 weight-%, of the first oxygen storage component comprised in the first coating according to (ii) of the catalyst consist of cerium oxide, calculated as $CeO_2$, based on the weight of the first oxygen storage component.

It is preferred that the first oxygen storage component comprised in the first coating according to (ii) further comprises one or more of aluminum oxide and zirconium oxide, more preferably aluminum oxide or zirconium oxide.

In the case where the first oxygen storage component comprised in the first coating according to (ii) further comprises one or more of aluminum oxide and zirconium oxide, it is preferred that at least 80 weight-%, more preferably at least 85 weight-%, more preferably at least 90 weight %, more preferably from 90 to 100 weight-%, of the first oxygen storage component comprised in the first coating according to (ii) of the catalyst consist of cerium oxide, calculated as $CeO_2$, and one or more of aluminum oxide, calculated as $Al_2O_3$, and zirconium oxide, calculated as $ZrO_2$.

In the case where the first oxygen storage component comprised in the first coating according to (ii) further comprises one or more of aluminum oxide and zirconium oxide, it is preferred that in the first oxygen storage component, the weight ratio of cerium oxide, calculated as $CeO_2$, to the one or more of aluminum oxide, calculated as $Al_2O_3$, and zirconium oxide, calculated as $ZrO_2$, is in the range of from 0.7:1 to 1.3:1, more preferably in the range of from 0.8:1 to 1.2:1, more preferably in the range of from 0.9:1 to 1.1:1.

It is preferred that the first oxygen storage component comprised in the first coating according to (ii) of the catalyst further comprises aluminum oxide, more preferably from 10 to 70 weight-%, more preferably from 30 to 65 weight-%, more preferably from 45 to 60 weight-%, aluminum oxide, calculated as $Al_2O_3$, based on the weight of the first oxygen storage component.

In the case where the first oxygen storage component comprised in the first coating according to (ii) of the catalyst further comprises aluminum oxide, it is preferred that from 95 to 100 weight %, more preferably from 98 to 100 weight-%, more preferably from 99 to 100 weight-%, of the first oxygen storage component consist of cerium oxide, calculated as $CeO_2$, and aluminum oxide, calculated as $Al_2O_3$, based on the weight of the first oxygen storage component.

In the case where the first oxygen storage component comprised in the first coating according to (ii) of the catalyst further comprises aluminum oxide, it is preferred that the first oxygen storage component exhibits a zirconium content, calculated as $ZrO_2$, in the range of from 0 to 1 weight-%, more preferably in the range of from 0 to 0.5 weight-%, more preferably in the range of from 0 to 0.1 weight-%, based on the weight of the first oxygen storage component.

It is preferred that the first oxygen storage component comprised in the first coating according to (ii) of the catalyst further comprises zirconium oxide, more preferably from 10 to 70 weight-%, more preferably from 30 to 65 weight-%, more preferably from 45 to 60 weight-%, zirconium oxide, calculated as $ZrO_2$, based on the weight of the first oxygen storage component.

In the case where the first oxygen storage component comprised in the first coating according to (ii) of the catalyst further comprises zirconium oxide, it is preferred that the first oxygen storage component further comprises one or more of lanthanum oxide and praseodymium oxide, wherein the first oxygen storage component more preferably further comprises lanthanum oxide and praseodymium oxide.

In the case where the first oxygen storage component comprised in the first coating according to (ii) of the catalyst further comprises zirconium oxide, it is preferred that from 5 to 15 weight-%, more preferably from 7 to 13 weight-%, more preferably from 9 to 11 weight-%, of the first oxygen storage component consist of lanthanum oxide, calculated as $La_2O_3$, and praseodymium oxide, calculated as $Pr_6O_{11}$, based on the weight of the first oxygen storage component.

In the case where the first oxygen storage component comprised in the first coating according to (ii) of the catalyst further comprises zirconium oxide, it is preferred that from 95 to 100 weight %, more preferably from 98 to 100 weight-%, more preferably from 99 to 100 weight-%, of the first oxygen storage component consist of cerium oxide, calculated as $CeO_2$, zirconium oxide, calculated as $ZrO_2$, and more preferably one or more of lanthanum oxide, calculated as $La_2O_3$, and praseodymium oxide, calculated as $Pr_6O_{11}$, based on the weight of the first oxygen storage component.

In the case where the first oxygen storage component comprised in the first coating according to (ii) of the catalyst further comprises zirconium oxide, it is preferred that the first oxygen storage component exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the first oxygen storage component.

In the case where the first oxygen storage component comprised in the first coating according to (ii) of the catalyst further comprises zirconium oxide, it is preferred that the first oxygen storage component exhibits a neodymium content, calculated as $Nd_2O_3$, in the range of from 0 to 1 weight-%, more preferably in the range of from 0 to 0.5 weight-%, more preferably in the range of from 0 to 0.1 weight-%, based on the weight of the first oxygen storage component.

In the case where the first oxygen storage component comprised in the first coating according to (ii) of the catalyst further comprises zirconium oxide, it is preferred that the catalyst comprises the first oxygen storage component at a loading in the range of from 0.01 to 1 g/in$^3$, more preferably in the range of from 0.1 to 0.8 g/in$^3$, more preferably in the range of from 0.2 to 0.7 g/in$^3$, more preferably in the range of from 0.25 to 0.65 g/in$^3$, more preferably in the range of from 0.27 to 0.61 g/in$^3$.

It is preferred that the catalyst further comprises, in the first coating, a second oxygen storage component different from the first oxygen storage component, said second oxygen storage component comprising cerium oxide, more preferably at most 50 weight-% of cerium oxide, calculated as $CeO_2$, based on the weight of the second oxygen storage component.

In the case where the catalyst further comprises, in the first coating, a second oxygen storage component different from the first oxygen storage component, it is preferred that from 15 to 50 weight-%, more preferably from 20 to 40 weight-%, more preferably from 25 to 35 weight-%, more preferably from 26 to 30 weight-%, more preferably from 27 to 29 weight-%, of the second oxygen storage component consist of cerium oxide, calculated as $CeO_2$, based on the weight of the second oxygen storage component.

In the case where the catalyst further comprises, in the first coating, a second oxygen storage component different from the first oxygen storage component, it is preferred that the second oxygen storage component further comprises one or more of aluminum oxide and zirconium oxide, more preferably zirconium oxide.

In the case where the catalyst further comprises, in the first coating, a second oxygen storage component different from the first oxygen storage component, it is preferred that the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component.

In the case where the catalyst further comprises, in the first coating, a second oxygen storage component different from the first oxygen storage component, wherein the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component, it is preferred that the second oxygen storage component further comprises one or more of lanthanum oxide, praseodymium oxide, and neodymium oxide, wherein the second oxygen storage component more preferably further comprises lanthanum oxide, praseodymium oxide and neodymium oxide.

In the case where the catalyst further comprises, in the first coating, a second oxygen storage component different from the first oxygen storage component, wherein the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component, it is preferred that from 10 to 20 weight-%, more preferably from 12 to 18 weight-%, more preferably from 14 to 16 weight-%, of the second oxygen storage component consist of lanthanum oxide, calculated as $La_2O_3$, praseodymium oxide, calculated as $Pr_6O_{11}$, and neodymium oxide, calculated as $Nd_2O_3$, based on the weight of the second oxygen storage component.

In the case where the catalyst further comprises, in the first coating, a second oxygen storage component different from the first oxygen storage component, wherein the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component, it is preferred that from 95 to 100 weight-%, more preferably from 98 to 100 weight-%, more preferably from 99 to 100 weight-%, of the second oxygen storage component consist of cerium oxide, calculated as $CeO_2$, zirconium oxide, calculated as $ZrO_2$, and more preferably one or more of lanthanum oxide, calculated as $La_2O_3$, and praseodymium oxide, calculated as $Pr_6O_{11}$, and neodymium oxide, calculated as $Nd_2O_3$, based on the weight of the second oxygen storage component.

In the case where the catalyst further comprises, in the first coating, a second oxygen storage component different from the first oxygen storage component, wherein the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component, it is preferred that the second oxygen storage component exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the second oxygen storage component.

In the case where the catalyst further comprises, in the first coating, a second oxygen storage component different from the first oxygen storage component, wherein the second oxygen storage component comprises from 45 to 80 weight-%, more preferably from 50 to 70 weight-%, more preferably from 55 to 60 weight-%, of zirconium oxide, calculated as $ZrO_2$, based on the weight of the second oxygen storage component, it is preferred that the catalyst comprises the second oxygen storage component at a loading in the range of from 0.01 to 0.50 g/in$^3$, more preferably in the range of from 0.05 to 0.40 g/in$^3$, more preferably in the range of from 0.10 to 0.35 g/in$^3$, more preferably in the range of from 0.13 to 0.30 g/in$^3$.

It is preferred that the first platinum group metal component comprised in the first coating according to (ii) of the catalyst comprises, more preferably consists of, one more of Ru, Os, Rh, Ir, Pd, and Pt, preferably one or more of Rh and Pd, wherein the first platinum group metal component more preferably comprises, more preferably consists of, Pd.

It is preferred that the first coating according to (ii) of the catalyst comprises the first platinum group metal component at a loading in the range of from 5 to 85 g/ft$^3$, more preferably in the range of from 25 to 65 g/ft$^3$, more preferably in the range of from 30 to 55 g/ft$^3$.

It is preferred that the first oxidic support material comprised in the first coating according to (ii) of the catalyst comprises Al, more preferably Al and one or more of Si, Zr, Ti, and La, more preferably Al and Si or more preferably Al and La.

It is preferred that the first oxidic support material comprised in the first coating according to (ii) of the catalyst exhibits a BET specific surface area of higher than 140 m$^2$/g, wherein the BET specific surface area is more preferably determined according to Reference Example 1.

It is preferred that the first oxidic support material comprised in the first coating according to (ii) of the catalyst exhibits a total pore volume of higher than 0.5 ml/g, wherein the total pore volume is more preferably determined according to Reference Example 2.

It is preferred that the first oxidic support material comprised in the first coating according to (ii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica or alumina-lanthana.

In the case where the first oxidic support material comprised in the first coating according to (ii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, it is preferred that from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively.

In the case where the first oxidic support material comprised in the first coating according to (ii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, it is preferred that from 1 to 10 weight-%, more preferably from 3 to 8 weight-%, more preferably from 4 to 7 weight-%, of the alumina-silica consist of silica, calculated as $SiO_2$, based on the weight of the alumina-silica.

In the case where the first oxidic support material comprised in the first coating according to (ii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, it is preferred that from 1 to 10 weight-%, more preferably from 3 to 8 weight-%, more preferably from 4 to 7 weight-%, of the alumina-lanthana consist of lanthana, calculated as $La_2O_3$, based on the weight of the alumina-lanthana.

It is preferred that the catalyst comprises the first oxidic support material at a loading in the range of from 0.3 to 1.6 g/in$^3$, more preferably in the range of from 0.45 to 1.4 g/in$^3$, more preferably in the range of from 0.8 to 1.2 g/in$^3$.

It is preferred that the second platinum group metal component comprised in the first coating according to (ii) of the catalyst comprises, preferably consists of, one or more of Ru, Os, Rh, Ir, Pd, and Pt, more preferably one or more of Rh and Pd, wherein the second platinum group metal component more preferably comprises, more preferably consists of, Rh.

It is preferred that the first coating according to (ii) of the catalyst comprises the second platinum group metal component in the range of from 1 to 9 g/ft$^3$, more preferably in the range of from 2.4 to 7 g/ft$^3$, more preferably in the range of from 4.9 to 5.1 g/ft$^3$.

It is preferred that the second oxidic support material comprised in the first coating according to (ii) of the catalyst comprises Al, more preferably Al and one or more of Si, Zr, Ti, and La, more preferably Al, Zr, and La.

It is preferred that the second oxidic support material comprised in the first coating according to (ii) of the catalyst comprises, more preferably consists of, one or more of alumina, zirconia, lanthana, alumina-zirconia, alumina-lanthana, zirconia-lanthana, and alumina-zirconia-lanthana, more preferably alumina-zirconia-lanthana.

In the case where the second oxidic support material comprised in the first coating according to (ii) of the catalyst comprises, more preferably consists of, one or more of alumina, zirconia, lanthana, alumina-zirconia, alumina-lanthana, zirconia-lanthana, and alumina-zirconia-lanthana, it is preferred that from 68 to 84 weight-%, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana.

In the case where the second oxidic support material comprised in the first coating according to (ii) of the catalyst comprises, more preferably consists of, one or more of alumina, zirconia, lanthana, alumina-zirconia, alumina-lanthana, zirconia-lanthana, and alumina-zirconia-lanthana, it is preferred that from 15 to 25 weight-%, more preferably from 17 to 23 weight-%, more preferably from 19 to 21 weight-%, of the alumina-zirconia-lanthana consist of zirconia, calculated as $ZrO_2$, based on the weight of the alumina-zirconia-lanthana.

In the case where the second oxidic support material comprised in the first coating according to (ii) of the catalyst comprises, more preferably consists of, one or more of alumina, zirconia, lanthana, alumina-zirconia, alumina-lanthana, zirconia-lanthana, and alumina-zirconia-lanthana, it is preferred that from 1 to 7 weight-%, more preferably from 2 to 6 weight-%, more preferably from 3 to 5 weight-%, of the alumina-zirconia-lanthana consist of lanthana, calculated as $La_2O_3$, based on the weight of the alumina-zirconia-lanthana.

It is preferred that the catalyst comprises the second oxidic support material at a loading in the range of from 0.10 to 0.75 g/in$^3$, more preferably in the range of from 0.20 to 0.65 g/in$^3$, more preferably in the range of from 0.30 to 0.60 g/in$^3$.

It is preferred that the second oxidic support material comprised in the first coating according to (ii) of the catalyst exhibits a BET specific surface area of higher than 130 m$^2$/g, wherein the BET specific surface area is more preferably determined according to Reference Example 1.

It is preferred that the second oxidic support material comprised in the first coating according to (ii) of the catalyst exhibits a total pore volume of higher than 0.6 ml/g, wherein the total pore volume is more preferably determined according to Reference Example 2.

It is preferred that the catalyst comprises, in the first coating, a fifth platinum group metal component supported on a zeolitic material.

In the case where the catalyst further comprises a fifth platinum group metal component supported on a zeolitic material, it is preferred that the fifth platinum group metal component comprises, more preferably consists of, one more of Ru, Os, Rh, Ir, Pd, and Pt, more preferably one or more of Rh and Pd, wherein the fifth platinum group metal component more preferably comprises, more preferably consists of, Pd.

In the case where the catalyst further comprises a fifth platinum group metal component supported on a zeolitic material, it is preferred that the first coating according to (ii) comprises the fifth platinum group metal component at a loading in the range of from 5 to 85 g/ft$^3$, more preferably in the range of from 25 to 65 g/ft$^3$, more preferably in the range of from 30 to 55 g/ft$^3$.

In the case where the catalyst further comprises a fifth platinum group metal component supported on a zeolitic material, it is preferred that the zeolitic material comprises the fifth platinum group metal component in an amount in the range of from 1.0 to 2.5 weight-%, more preferably in the range of from 1.4 to 2.0 weight-%, more preferably in the range of from 1.6 to 1.8 weight %, based on the weight of the zeolitic material.

In the case where the catalyst further comprises a fifth platinum group metal component supported on a zeolitic material, it is preferred that the framework structure of the zeolitic material comprises a tetravalent element Y, a trivalent element X and oxygen, wherein the tetravalent element Y is more preferably selected from the group consisting of Si, Sn, Ti, Zr, Ge, and a mixture of two or more thereof, more preferably from the group consisting of Si, Ti, and a mixture of two or more thereof, wherein more preferably the tetravalent element Y is Si and/or Ti, and wherein the trivalent element X is more preferably selected from the group consisting of B, Al, Ga, In, and a mixture of two or more thereof, preferably from the group consisting of B, Al, and a mixture of two or more thereof, wherein more preferably the tetravalent element Y is B and/or Al.

In the case where the catalyst further comprises a fifth platinum group metal component supported on a zeolitic material, it is preferred that the zeolitic material comprises, preferably consists of, a 10 or more-membered ring pore zeolitic material, wherein the zeolitic material more preferably comprises, more preferably consists of, one or more of a 10-membered ring pore zeolitic material and a 12-membered ring pore zeolitic material.

In the case where the catalyst further comprises a fifth platinum group metal component supported on a zeolitic material, it is preferred that the zeolitic material exhibits a molar ratio of Y to X, calculated as $YO_2$:$X_2O_3$, in the range of from 5:1 to 50:1, more preferably in the range of from 15:1 to 30:1, more preferably in the range of from 19:1 to 23:1.

In the case where the catalyst further comprises a fifth platinum group metal component supported on a zeolitic material, it is preferred that from 95 to 100 weight-%, more preferably from 97 to 100 weight-%, more preferably from 99 to 100 weight-%, of the zeolitic material consists of Y, X, O, and H, based on the weight of the zeolitic material.

In the case where the catalyst further comprises a fifth platinum group metal component supported on a zeolitic material, it is preferred that the zeolitic material has a framework type selected from the group consisting of AEL, AFO, BEA, CHA, FAU, FER, HEU, GIS, GME, LEV, LTA, MOR, MTT, MEL, MFS, MFI, MWW, OFF, RRO, SZR, TON, USY, a mixture of two or more thereof and a mixed type of two or more thereof, more preferably selected from the group consisting of BEA, FAU, FER, GIS, LTA, MEL, MWW, MFS, MFI, MOR, MTT, TON, a mixture of two or more thereof and a mixed type of two or more thereof, more preferably selected from the group consisting of BEA, FAU, FER, GIS, and MFI, wherein more preferably the zeolitic material has a FER framework type.

In the case where the catalyst further comprises a fifth platinum group metal component supported on a zeolitic material, it is preferred that the catalyst comprises the zeolitic material at a loading in the range of from 1.5 to 2.5 g/in$^3$, more preferably in the range of from 1.8 to 2.2 g/in$^3$, more preferably in the range of from 1.9 to 2.1 g/in$^3$.

It is preferred that the catalyst further comprises, in the first coating, barium oxide, more preferably at a loading in the range of from 0.03 to 0.11 g/in$^3$, more preferably in the range of from 0.05 to 0.09 g/in$^3$, more preferably in the range of from 0.06 to 0.08 g/in$^3$, calculated as BaO.

It is preferred that the catalyst further comprises, in the first coating, zirconium oxide, more preferably at a loading in the range of from 0.05 to 0.15 g/in$^3$, more preferably in the range of from 0.08 to 0.12 g/in$^3$, more preferably in the range of from 0.09 to 0.11 g/in$^3$, calculated as $ZrO_2$.

It is preferred that the first coating according to (ii) of the catalyst comprises from 0 to 0.1 weight-%, more preferably from 0 to 0.01 weight-%, more preferably from 0 to 0.001 weight-%, of Pt calculated as elemental Pt, wherein the first coating is preferably essentially free of Pt, wherein the first coating more preferably is free of Pt.

It is preferred that from 95 to 100 weight-%, more preferably from 97 to 100 weight-%, more preferably from 99 to 100 weight-%, of the first coating according to (ii) of the catalyst consist of the first platinum group metal component, the first oxidic support material, the second platinum group metal component, the second oxidic support material, the first oxygen storage component, optionally the second oxygen storage material, optionally the fifth platinum group metal component, optionally the zeolitic material, optionally barium oxide, and optionally zirconium oxide, wherein more preferably from 95 to 100 weight-%, more preferably from 97 to 100 weight-%, more preferably from 99 to 100 weight-%, of the first coating according to (ii) consist of the first platinum group metal component, the first oxidic support material, the second platinum group metal component, the second oxidic support material, the first oxygen storage component, optionally the second oxygen storage material, optionally the fifth platinum group metal component, optionally the zeolitic material, barium oxide, and optionally zirconium oxide, wherein more preferably from 95 to 100 weight-%, more preferably from 97 to 100 weight-%, more preferably from 99 to 100 weight-%, of the first coating according to (ii) consist of the first platinum group metal component, the first oxidic support material, the second platinum group metal component, the second oxidic support material, the first oxygen storage component, optionally the second oxygen storage material, optionally the fifth platinum group metal component, the zeolitic material, optionally barium oxide, and zirconium oxide.

It is preferred that the second coating according to (iii) of the catalyst extends over 50 to 100%, more preferably over 55 to 100%, more preferably over 60 to 100%, more preferably over 65 to 100%, of the axial length of the substrate from the outlet end toward the inlet end of the substrate.

In the case where the second coating according to (iii) of the catalyst extends over 50 to 100%, more preferably over 55 to 100%, more preferably over 60 to 100%, more preferably over 65 to 100%, of the axial length of the substrate from the outlet end toward the inlet end of the substrate, it is preferred according to a first alternative that the second coating extends over 95 to 100%, more preferably over 98 to 100%, more preferably over 99 to 100%, of the axial length of the substrate from the outlet end toward the inlet end of the substrate.

In the case where the second coating according to (iii) of the catalyst extends over 50 to 100%, more preferably over 55 to 100%, more preferably over 60 to 100%, more preferably over 65 to 100%, of the axial length of the substrate from the outlet end toward the inlet end of the substrate, it is preferred according to a second alternative that the second coating extends over 65 to 90%, more preferably over 65 to 80%, more preferably over 65 to 75%, of the axial length of the substrate from the outlet end toward the inlet end of the substrate.

It is preferred that the third platinum group metal component comprised in the second coating according to (iii) of the catalyst comprises, more preferably consists of, one more of Ru, Os, Rh, Ir, Pd, and Pt, wherein the third platinum group metal component more preferably comprises, more preferably consists of, Pd.

It is preferred that the fourth platinum group metal component comprised in the second coating according to (iii) of the catalyst comprises, more preferably consists of, one more of Ru, Os, Rh, Ir, Pd, and Pt, wherein the fourth platinum group metal component more preferably comprises, more preferably consists of, Pt.

It is preferred that the weight ratio of the third platinum group metal component comprised in the second coating according to (iii) of the catalyst to the fourth platinum group metal component comprised in the second coating according to (iii) of the catalyst is in the range of from 1:1 to 20:1, more preferably in the range of from 4:1 to 12:1, more preferably in the range of from 7:1 to 9:1.

It is preferred that the second coating according to (iii) of the catalyst comprises the third platinum group metal component at a loading in the range of from 5 to 40 g/ft$^3$, more preferably in the range of from 7 to 15 g/ft$^3$, more preferably in the range of from 10 to 13 g/ft$^3$.

It is preferred that the second coating according to (iii) of the catalyst comprises the fourth platinum group metal component at a loading in the range of from 55 to 110 g/ft$^3$, more preferably in the range of from 80 to 105 g/ft$^3$, more preferably in the range of from 88 to 100 g/ft$^3$.

It is preferred that the third oxidic support material comprised in the second coating according to (iii) of the catalyst comprises Al, more preferably Al and one or more of Si, Zr, Ti, and La, more preferably Al and Si.

It is preferred that the third oxidic support material comprised in the second coating according to (iii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, preferably one or more of alumina, silica, lanthana, alumina-silica, alumina-lanthana, and silica-lanthana, more preferably alumina-silica.

In the case where the third oxidic support material comprised in the second coating according to (iii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, preferably one or more of alumina, silica, lanthana, alumina-silica, alumina-lanthana, and silica-lanthana, more preferably alumina-silica, it is preferred that from 90 to 99 weight-%, more preferably from 92 to 97 weight-%, more preferably from 94 to 96 weight-%, of the alumina-silica or of the alumina-lanthana consist of alumina, calculates as $Al_2O_3$, based on the weight of the alumina-silica or on the weight of the alumina-lanthana, respectively.

In the case where the third oxidic support material comprised in the second coating according to (iii) of the catalyst comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica, it is preferred that from 1 to 10 weight-%, preferably from 3 to 8 weight-%, more preferably from 4 to 6 weight-%, of the alumina-silica consist of silica, calculates as $SiO_2$, based on the weight of the alumina-silica.

It is preferred that the catalyst comprises the third oxidic support material at a loading in the range of from 0.5 to 3.5 g/in$^3$, more preferably in the range of from 1.2 to 3.0 g/in$^3$, more preferably in the range of from 1.4 to 2.7 g/in$^3$.

It is preferred that the third oxidic support material comprised in the second coating according to (iii) of the catalyst exhibits a BET specific surface area of higher than 150 $m^2/g$, wherein the BET specific surface area is more preferably determined according to Reference Example 1.

It is preferred that the third oxidic support material comprised in the second coating according to (iii) of the catalyst exhibits a total pore volume of higher than 0.5 ml/g, wherein the total pore volume is more preferably determined according to Reference Example 2.

It is preferred that the second coating according to (iii) of the catalyst comprises from 0 to 0.1 weight-%, more preferably from 0 to 0.01 weight-%, more preferably from 0 to 0.001 weight-%, of an oxygen storage component, more preferably of an oxygen storage component as defined in any one of the embodiments disclosed herein, wherein the second coating is preferably essentially free of an oxygen storage component, wherein the second coating more preferably is free of an oxygen storage component.

It is preferred that the second coating according to (iii) of the catalyst comprises from 0 to 1 weight-%, more preferably from 0 to 0.1 weight-%, more preferably from 0 to 0.01 weight-%, of a zeolitic material, more preferably the zeolitic material as defined in any one of the embodiments disclosed herein, wherein the second coating is more preferably essentially free of a zeolitic material, wherein the second coating more preferably is free of a zeolitic material.

It is preferred that from 95 to 100 weight-%, preferably from 97 to 100 weight-%, more preferably from 99 to 100 weight-%, of the second coating according to (iii) of the catalyst consist of the third platinum group metal component, the fourth platinum group metal component, and the third oxidic support material.

It is preferred that the first coating according to (ii) of the catalyst is different to the second coating according to (iii).

It is preferred that the sum of the loading of the first platinum group metal component comprised in the first coating according to (ii) of the catalyst, the loading of the third platinum group metal component comprised in the second coating according to (iii) of the catalyst, and optionally the loading of the fifth platinum group metal component comprised in the first coating according to (ii) of the catalyst, is in the range of from 10 to 125 $g/ft^3$, more preferably in the range of from 30 to 80 $g/ft^3$, more preferably in the range of from 40 to 67 $g/ft^3$.

It is preferred that the first platinum group metal component comprised in the first coating according to (ii) of the catalyst, the second platinum group metal component comprised in the first coating according to (ii) of the catalyst, the third platinum group metal component comprised in the second coating according to (iii) of the catalyst, the fourth platinum group metal component comprised in the second coating according to (iii) of the catalyst, and the fifth platinum group metal component comprised in the first coating according to (ii) of the catalyst independently from each other comprises, more preferably consists of, one more of Ru, Os, Rh, Ir, Pd, and Pt.

It is preferred that the catalyst has a loading of the second platinum group metal component comprised in the first coating according to (ii) of the catalyst in the range of from 1 to 9 $g/ft^3$, more preferably in the range of from 2.4 to 7 $g/ft^3$, more preferably in the range of from 4.9 to 5.1 $g/ft^3$.

It is preferred that the catalyst has a loading of the fourth platinum group metal component comprised in the second coating according to (iii) of the catalyst in the range of from 55 to 110 $g/ft^3$, more preferably in the range of from 80 to 105 $g/ft^3$, more preferably in the range of from 88 to 100 $g/ft^3$.

It is preferred that the catalyst consists of the substrate according to (i) of the catalyst, the first coating according to (ii) of the catalyst and the second coating according to (iii) of the catalyst.

Further, the present invention relates to a process for the preparation of a catalyst, preferably of a catalyst according to any one of the embodiments disclosed herein, said process comprising (a) providing a substrate comprising an inlet end, an outlet end, a substrate axial length extending from the inlet end to the outlet end of the substrate and a plurality of passages defined by internal walls of the substrate extending therethrough, and a first slurry comprising water, a first platinum group metal component supported on a first oxidic support material, a second platinum group metal component supported on a second oxidic support material, wherein the first platinum group metal component is different to the second platinum group metal component, a first oxygen storage compound, optionally a second oxygen storage component, optionally a fifth platinum group component supported on a zeolitic material, optionally a source of BaO, and optionally a source of $ZrO_2$;

(b) disposing the first slurry on the internal walls of the substrate from the inlet end toward the outlet end over at least 50% of the substrate axial length; obtaining a substrate having a first coating disposed thereon;

(c) optionally drying of the substrate having a first coating disposed thereon obtained in (b) in a gas atmosphere;

(d) calcining of the substrate having a first coating disposed thereon obtained in (b), or (c), in a gas atmosphere, obtaining a calcined substrate having a first coating disposed thereon;

(e) providing a second slurry comprising water, a third platinum group metal component and a fourth platinum group metal component, wherein the third platinum group metal component and the fourth platinum group metal component are supported on a third oxidic support material, wherein the third platinum group metal component is different to the fourth platinum group metal component;

(f) disposing the second slurry on the substrate having a first coating disposed thereon from the outlet end toward the inlet end the substrate over at least 50% of the substrate axial length; obtaining a substrate having a first and a second coating disposed thereon;

(g) optionally drying of the substrate having a first and a second coating disposed thereon obtained in (f) in a gas atmosphere;

(h) calcining of the substrate having a first and a second coating disposed thereon obtained in (f), or (g), in a gas atmosphere; obtaining the catalyst.

It is preferred that providing the first slurry in (a) of the process comprises (a.1) mixing of water, a first platinum group metal component supported on a first oxidic support material, a first oxygen storage compound, and optionally a second oxygen storage component;

(a.2) mixing of water, a second platinum group metal component supported on a second oxidic support material, wherein the first platinum group metal component is different to the second platinum group metal component, optionally a fifth platinum group metal component supported on a zeolitic material, optionally a source of BaO, and optionally a source of $ZrO_2$;

(a.3) mixing of the mixture obtained in (a.1) and the mixture obtained in (a.2).

It is preferred that the substrate provided in (a) of the process comprises a ceramic and/or a metallic substance, more preferably a ceramic substance, more preferably a ceramic substance which is one or more of alumina, silica, silicate, aluminosilicate, aluminotitanate, silicon carbide, cordierite, mullite, zirconia, spinel, magnesia, and titania, more preferably one or more of alpha-alumina, aluminotitanate, silicon carbide, and cordierite, more preferably one or more of aluminotitanate, silicon carbide, and cordierite, wherein more preferably the substrate comprises cordierite, more preferably consists of cordierite.

It is preferred that the substrate provided in (a) of the process is a monolith, more preferably a honeycomb monolith, wherein the honeycomb monolith is more preferably a wall-flow or flow-through monolith, preferably a flow-through monolith.

It is preferred that the substrate provided in (a) of the process has a total volume in the range of from 0.1 to 4 l, more preferably in the range of from 0.20 to 2.5 l, more preferably in the range of from 0.30 to 2.1 l, more preferably in the range of from 1.0 to 2.1 l.

It is preferred that the first slurry provided in (a) of the process is disposed on the internal walls of the substrate from the inlet end toward the outlet end of the substrate over 50 to 100%, more preferably over 55 to 100%, more preferably over 60 to 100%, more preferably over 65 to 100%, of the substrate axial length.

It is preferred that the first slurry provided in (a) of the process is disposed on the internal walls of the substrate from the inlet end toward the outlet end of the substrate according to a first alternative over 95 to 100%, more preferably over 98 to 100%, more preferably over 99 to 100%, of the substrate axial length.

It is preferred that the first slurry provided in (a) of the process is disposed on the internal walls of the substrate from the inlet end toward the outlet end of the substrate according to a second alternative over 65 to 90%, more preferably over 65 to 80%, more preferably over 65 to 75%, of the substrate axial length.

It is preferred that from 30 to 90 weight-%, more preferably from 32 to 80 weight-%, more preferably from 35 to 70 weight-%, more preferably from 40 to 55 weight-%, of the first oxygen storage component comprised in the first slurry provided in (a) of the process consist of cerium oxide, calculated as $CeO_2$, based on the weight of the first oxygen storage component.

It is preferred that the first oxygen storage component comprised in the first slurry provided in (a) of the process further comprises one or more of aluminum oxide and zirconium oxide, more preferably aluminum oxide or zirconium oxide, wherein more preferably at least 80 weight-%, more preferably at least 85 weight-%, more preferably at least 90 weight-%, more preferably from 90 to 100 weight-%, of the first oxygen storage component consist of cerium oxide, calculated as $CeO_2$, and one or more of aluminum oxide, calculated as $Al_2O_3$, and zirconium oxide, calculated as $ZrO_2$, based on the weight of the first oxygen storage component.

It is preferred that the first oxygen storage component comprised in the first slurry provided in (a) of the process further comprises aluminum oxide, wherein the first oxygen storage component comprises more preferably from 10 to 70 weight-%, more preferably from 30 to 65 weight %, more preferably from 45 to 60 weight-% of aluminum oxide, calculated as $Al_2O_3$, based on the weight of the first oxygen storage component, wherein more preferably from 95 to 100 weight-%, more preferably from 98 to 100 weight-%, more preferably from 99 to 100 weight-%, of the first oxygen storage component consist of cerium oxide, calculated as $CeO_2$, and aluminum oxide, calculated as $Al_2O_3$, based on the weight of the first oxygen storage component, wherein the first oxygen storage component more preferably exhibits a zirconium content, calculated as $ZrO_2$, in the range of from 0 to 1 weight-%, preferably in the range of from 0 to 0.5 weight-%, more preferably in the range of from 0 to 0.1 weight-%, based on the weight of the first oxygen storage component.

It is preferred that the first oxygen storage component comprised in the first slurry provided in (a) of the process further comprises zirconium oxide, more preferably from 10 to 70 weight-%, more preferably from 30 to 65 weight-%, more preferably from 45 to 60 weight-%, of zirconium oxide, calculated as $ZrO_2$, based on the weight of the first oxygen storage component, wherein the first oxygen storage component preferably further comprises one or more of lanthanum oxide and praseodymium, wherein the first oxygen storage component more preferably further comprises lanthanum oxide and praseodymium oxide, wherein more preferably from 5 to 15 weight-%, more preferably from 7 to 13 weight-%, more preferably from 9 to 11 weight-%, of the first oxygen storage component consist of lanthanum oxide, calculated as $La_2O_3$, and praseodymium oxide, calculated as $Pr_6O_{11}$, based on the weight of the first oxygen storage component.

In the case where the first oxygen storage component comprised in the first slurry provided in (a) of the process further comprises zirconium oxide, it is preferred that from 95 to 100 weight %, more preferably from 98 to 100 weight-%, more preferably from 99 to 100 weight-%, of the first oxygen storage component consist of cerium oxide, calculated as $CeO_2$, zirconium oxide, calculated as $ZrO_2$, and preferably of one or more of lanthanum oxide, calculated as $La_2O_3$ and praseodymium oxide, calculated as $Pr_6O_{11}$, based on the weight of the first oxygen storage component, wherein the first oxygen storage component more preferably exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the first oxygen storage component, wherein the first oxygen storage component more preferably exhibits a neodymium content, calculated as $Nd_2O_3$, in the range of from 0 to 1 weight-%, more preferably in the range of from 0 to 0.5 weight-%, more preferably in the range of from 0 to 0.1 weight-%, based on the weight of the first oxygen storage component.

It is preferred that the second oxygen storage component is comprised in the first slurry provided in (a) of the process, wherein the second oxygen storage component is different from the first oxygen storage component, said second oxygen storage component comprising cerium oxide, preferably at most 50 weight-% of cerium oxide, calculated as $CeO_2$, wherein more preferably from 15 to 50 weight-%, more preferably from 20 to 40 weight-%, more preferably from 25 to 35 weight-%, more preferably from 26 to 30 weight-%, more preferably from 27 to 29 weight-%, of the second oxygen storage component consist of cerium oxide, calculated as $CeO_2$, based on the weight of the second oxygen storage component.

In the case where the second oxygen storage component is comprised in the first slurry provided in (a) of the process, wherein the second oxygen storage component is different from the first oxygen storage component, said second oxygen storage component comprising cerium oxide, it is preferred that the second oxygen storage component further comprises one or more of aluminum oxide and zirconium oxide, more preferably zirconium oxide, wherein the second oxygen storage component preferably comprises from 45 to 80 weight-%, more preferably from 50 to 70 weight-%, more preferably from 55 to 60 weight-%, of zirconium oxide, calculated as $ZrO_2$, based on the weight of the second oxygen storage component, wherein the second oxygen storage component preferably further comprises one or more of lanthanum oxide, praseodymium oxide, and neodymium oxide, wherein the second oxygen storage component more preferably further comprises lanthanum oxide, praseodymium oxide and neodymium oxide, wherein preferably from 10 to 20 weight-%, more preferably from 12 to 18 weight-%, more preferably from 14 to 16 weight-%, of the second oxygen storage component consist of lanthanum oxide, calculated as $La_2O_3$, praseodymium oxide, calculated as $Pr_6O_{11}$, and neodymium oxide, calculated as $Nd_2O_3$, based on the weight of the second oxygen storage component.

In the case where the second oxygen storage component is comprised in the first slurry provided in (a) of the process, wherein the second oxygen storage component is different from the first oxygen storage component, said second oxygen storage component comprising cerium oxide, it is preferred that from 95 to 100 weight-%, more preferably from 98 to 100 weight-%, more preferably from 99 to 100 weight-%, of the second oxygen storage component consist of cerium oxide, calculated as $CeO_2$, zirconium oxide, calculated as $ZrO_2$, and preferably one or more of lanthanum oxide, calculated as $La_2O_3$, and praseodymium oxide, calculated as $Pr_6O_{11}$, and neodymium oxide, calculated as $Nd_2O_3$, based on the weight of the second oxygen storage component, wherein the second oxygen storage component more preferably exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the second oxygen storage component.

It is preferred that the first platinum group metal component supported on a first oxidic support material comprised in the first slurry provided in (a) of the process is prepared by impregnating the first oxidic support material with a source of the first platinum group metal component.

In the case where the first platinum group metal component supported on a first oxidic support material comprised in the first slurry provided in (a) of the process is prepared by impregnating the first oxidic support material with a source of the first platinum group metal component, it is preferred that the source of the first platinum group metal component is selected from the group consisting of organic and inorganic salts of the first platinum group metal component, wherein the source of the first platinum group metal component more preferably comprises a nitrate of the first platinum group metal component.

It is preferred that the first platinum group metal component supported on a first oxidic support material is dispersed in the first slurry provided in (a) of the process with an acid, more preferably acetic acid or nitric acid, wherein the first slurry preferably has a pH in the range of from 3 to 5.

It is preferred that the first platinum group metal component comprises comprised in the first slurry provided in (a) of the process, more preferably consists of, one more of Ru, Os, Rh, Ir, Pd, and Pt, more preferably one or more of Rh and Pd, wherein the first platinum group metal component more preferably comprises, more preferably consists of, Pd.

It is preferred that the first oxidic support material comprised in the first slurry provided in (a) of the process comprises Al, more preferably Al and one or more of Si, Zr, Ti, and La, more preferably Al and Si or more preferably Al and La, wherein the first oxidic support material more preferably comprises one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, preferably one or more of alumina, silica, lanthana, alumina-silica, alumina-lanthana, and silica-lanthana, more preferably alumina-silica or alumina-lanthana, wherein more preferably from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively.

In the case where the first oxidic support material comprised in the first slurry provided in (a) of the process comprises Al, more preferably Al and one or more of Si, Zr, Ti, and La, more preferably Al and Si or more preferably Al and La, wherein the first oxidic support material more preferably comprises one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica or alumina-lanthana, wherein more preferably from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively, it is preferred that from 1 to 10 weight-%, more preferably from 3 to 8 weight-%, more preferably from 4 to 7 weight-%, of the alumina-silica consist of silica, based on the weight of the alumina-silica, or wherein from 1 to 10 weight-%, more preferably from 3 to 8 weight-%, more preferably from 4 to 7 weight-%, of the alumina-lanthana consist of lanthana, calculated as $La_2O_3$, based on the weight of the alumina-lanthana.

In the case where the first oxidic support material comprised in the first slurry provided in (a) of the process comprises Al, more preferably Al and one or more of Si, Zr, Ti, and La, more preferably Al and Si or more preferably Al and La, wherein the first oxidic support material more preferably comprises one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica or alumina-lanthana, wherein preferably from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively, it is preferred that the first oxidic support material exhibits a BET specific surface area of higher than 140 $m^2/g$, wherein the BET specific surface area is more preferably determined according to Reference Example 1, wherein the first oxidic support material more preferably exhibits a total pore volume of higher than 0.5 ml/g, wherein the total pore volume is more preferably determined according to Reference Example 2.

It is preferred that the second platinum group metal component supported on a second oxidic support material comprised in the first slurry provided in (a) of the process is prepared by impregnating the second oxidic support material with a source of the second platinum group metal component.

In the case where the second platinum group metal component supported on a second oxidic support material comprised in the first slurry provided in (a) of the process is prepared by impregnating the second oxidic support material with a source of the second platinum group metal component, it is preferred that the source of the second platinum group metal component is selected from the group consisting of organic and inorganic salts of the second platinum group metal component, wherein the source of the second platinum group metal component more preferably comprises a nitrate of the second platinum group metal component.

It is preferred that the second platinum group metal component comprised in the first slurry provided in (a) of the process comprises, more preferably consists of, one or more of Ru, Os, Rh, Ir, Pd, and Pt, more preferably one or more of Rh and Pd, wherein the second platinum group metal component more preferably comprises, more preferably consists of, Rh.

It is preferred that the second oxidic support material comprised in the first slurry provided in (a) of the process comprises Al, more preferably Al and one or more of Si, Zr, Ti, and La, more preferably Al, Zr, and La, wherein the second oxidic support material more preferably comprises, more preferably consists of, one or more of alumina, zirconia, lanthana, alumina-zirconia, alumina-lanthana, zirconia-lanthana, and alumina-zirconia-lanthana, more preferably alumina-zirconia-lanthana, wherein preferably from 68 to 84 weight-%, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana.

In the case where the second oxidic support material comprised in the first slurry provided in (a) of the process comprises Al, more preferably Al and one or more of Si, Zr, Ti, and La, more preferably Al, Zr, and La, wherein the second oxidic support material preferably comprises, more preferably consists of, one or more of alumina, zirconia, lanthana, alumina-zirconia, alumina-lanthana, zirconia-lanthana, and alumina-zirconia-lanthana, more preferably alumina-zirconia-lanthana, wherein more preferably from 68 to 84 weight-%, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana, it is preferred that from 15 to 25 weight-%, more preferably from 17 to 23 weight-%, more preferably from 19 to 21 weight-%, of the alumina-zirconia-lanthana consist of zirconia, wherein more preferably from 1 to 7 weight-%, more preferably from 2 to 6 weight-%, more preferably from 3 to 5 weight-%, of the alumina-zirconia-lanthana consist of lanthana, calculated as $La_2O_3$, based on the weight of the alumina-zirconia-lanthana.

In the case where the second oxidic support material comprised in the first slurry provided in (a) of the process comprises Al, more preferably Al and one or more of Si, Zr, Ti, and La, more preferably Al, Zr, and La, wherein the second oxidic support material more preferably comprises, more preferably consists of, one or more of alumina, zirconia, lanthana, alumina-zirconia, alumina-lanthana, zirconia-lanthana, and alumina-zirconia-lanthana, preferably alumina-zirconia-lanthana, wherein more preferably from 68 to 84 weight-%, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana, it is preferred that the second oxidic support material exhibits a BET specific surface area of higher than 130 $m^2/g$, wherein the BET specific surface area is more preferably determined according to Reference Example 1, wherein the second oxidic support material more preferably exhibits a total pore volume of higher than 0.6 ml/g, wherein the total pore volume is more preferably determined according to Reference Example 2.

It is preferred that the fifth platinum group metal component supported on a zeolitic material is comprised in the first slurry provided in (a) of the process, wherein the fifth platinum group metal component comprises, more preferably consists of, one more of Ru, Os, Rh, Ir, Pd, and Pt, more preferably one or more of Rh and Pd, wherein the fifth platinum group metal component more preferably comprises, more preferably consists of, Pd.

In the case where the fifth platinum group metal component supported on a zeolitic material is comprised in the first slurry provided in (a) of the process, wherein the fifth platinum group metal component comprises, more preferably consists of, one more of Ru, Os, Rh, Ir, Pd, and Pt, more preferably one or more of Rh and Pd, wherein the fifth platinum group metal component more preferably comprises, more preferably consists of, Pd, it is preferred that the zeolitic material comprises the fifth platinum group metal component in an amount in the range of from 1.0 to 2.5 weight-%, more preferably in the range of from 1.4 to 2.0 weight-%, more preferably in the range of from 1.6 to 1.8 weight-%, based on the weight of the zeolitic material.

In the case where the fifth platinum group metal component supported on a zeolitic material is comprised in the first slurry provided in (a) of the process, wherein the fifth platinum group metal component comprises, more preferably consists of, one more of Ru, Os, Rh, Ir, Pd, and Pt, more preferably one or more of Rh and Pd, wherein the fifth platinum group metal component more preferably comprises, more preferably consists of, Pd, it is preferred that the framework structure of the zeolitic material comprises a tetravalent element Y, a trivalent element X and oxygen, wherein the tetravalent element Y is more preferably selected from the group consisting of Si, Sn, Ti, Zr, Ge, and a mixture of two or more thereof, more preferably from the group consisting of Si, Ti, and a mixture of two or more thereof, wherein more preferably the tetravalent element Y is Si and/or Ti, wherein the trivalent element X is more preferably selected from the group consisting of B, Al, Ga, In, and a mixture of two or more thereof, preferably from the group consisting of B, Al, and a mixture of two or more thereof, wherein more preferably the trivalent element X is B and/or Al, wherein the zeolitic material comprises, more preferably consists of, a 10 or more-membered ring pore zeolitic material, wherein the zeolitic material more preferably comprises, more preferably consists of, one or more of a 10-membered ring pore zeolitic material and a 12-membered ring pore zeolitic material, wherein the zeolitic material more preferably exhibits a molar ratio of Y to X, calculated as $YO_2:X_2O_3$, in the range of from 5:1 to 50:1, more preferably in the range of from 15:1 to 30:1, more preferably in the range of from 19:1 to 23:1, wherein more preferably from 95 to 100 weight-%, more preferably from 97 to 100 weight-%, more preferably from 99 to 100 weight-%, of the zeolitic material consists of Y, X, 0, and H, based on the weight of the zeolitic material, wherein the zeolitic material more preferably has a framework type selected from the group consisting of AEL, AFO, BEA, CHA, FAU, FER, HEU, GIS, GME, LEV, LTA, MOR, MTT, MEL, MFS, MFI, MWW, OFF, RRO, SZR, TON, USY, a mixture of two or more thereof and a mixed type of two or more thereof, more preferably selected from the group consisting of BEA, FAU, FER, GIS, LTA, MEL, MWW, MFS, MFI, MOR, MTT, TON, a mixture of two or more thereof and a mixed type of two or more thereof, more preferably selected from the group consisting of BEA, FAU, FER, GIS, and MFI, wherein more preferably the zeolitic material has a FER framework type.

It is preferred that the source of BaO is comprised in the first slurry provided in (a) of the process, wherein the source of BaO more preferably comprises, more preferably consists of, a salt or an oxide of Ba, preferably barium nitrate.

It is preferred that the source of $ZrO_2$ is comprised in the first slurry provided in (a) of the process, wherein the source of $ZrO_2$ more preferably comprises, more preferably consists of, an organic or an inorganic salt of Zr, preferably zirconium acetate.

It is preferred that the second slurry provided in (e) of the process is at least partially disposed on the internal walls of the substrate or at least partially disposed on the first coating from the outlet end toward the inlet end of the substrate over 50 to 100%, more preferably 55 to 100%, more preferably 60 to 100%, more preferably 65 to 100%, of the substrate axial length.

In the case where the second slurry provided in (e) of the process is at least partially disposed on the internal walls of the substrate or at least partially disposed on the first coating from the outlet end toward the inlet end of the substrate over 50 to 100%, more preferably 55 to 100%, more preferably 60 to 100%, more preferably 65 to 100%, of the substrate axial length, it is preferred according to a first alternative that the second slurry is at least partially disposed on the internal walls of the substrate or at least partially disposed on the first coating from the outlet end toward the inlet end of the substrate over 95 to 100%, more preferably over 98 to 100%, more preferably over 99 to 100%, of the substrate axial length.

In the case where the second slurry provided in (e) of the process is at least partially disposed on the internal walls of the substrate or at least partially disposed on the first coating from the outlet end toward the inlet end of the substrate over 50 to 100%, more preferably 55 to 100%, more preferably 60 to 100%, more preferably 65 to 100%, of the substrate axial length, it is preferred according to a second alternative that the second slurry is at least partially disposed on the internal walls of the substrate or at least partially disposed on the first coating from the outlet end toward the inlet end of the substrate over 65 to 90%, more preferably over 65 to 80%, more preferably over 65 to 75%, of the substrate axial length.

It is preferred that the third platinum group metal component comprised in the second slurry provided in (e) of the process and the fourth platinum group metal component supported on a third oxidic support material comprised in the second slurry provided in (e) of the process is prepared by impregnating the third oxidic support material with a source of the third platinum group metal component and a source of the fourth platinum group metal component.

In the case where the third platinum group metal component and the fourth platinum group metal component supported on a third oxidic support material comprised in the second slurry provided in (e) is prepared by impregnating the third oxidic support material with a source of the third platinum group metal component and a source of the fourth platinum group metal component, it is preferred that the source of the third platinum group metal component is selected from the group consisting of organic and inorganic salts of the third platinum group metal component, wherein the source of the third platinum group metal component more preferably comprises a nitrate of the third platinum group metal component.

In the case where the third platinum group metal component and the fourth platinum group metal component supported on a third oxidic support material comprised in the second slurry provided in (e) is prepared by impregnating the third oxidic support material with a source of the third platinum group metal component and a source of the fourth platinum group metal component, it is preferred that the source of the fourth platinum group metal component is selected from the group consisting of organic and inorganic salts of the fourth platinum group metal component, wherein the fourth platinum group metal component more preferably comprises, more preferably consists of, Pt, and wherein the source of the fourth platinum group metal component preferably comprises, more preferably consists of, one or more of an ammine stabilized hydroxo Pt(II) complex, hexachloroplatinic acid, potassium hexachloroplatinate, and ammonium hexachloroplatinate, more preferably one or more of tetraammineplatinum chloride, and tetraammineplatinum nitrate, wherein the source of the fourth platinum group metal component preferably comprises, more preferably consists of, tetraammineplatinum chloride.

It is preferred that the third platinum group metal component comprised in the second slurry provided in (e) of the process comprises, more preferably consists of, one more of Ru, Os, Rh, Ir, Pd, and Pt, wherein the third platinum group metal component more preferably comprises, more preferably consists of, Pd.

It is preferred that the fourth platinum group metal component comprised in the second slurry provided in (e) of the process comprises, more preferably consists of, one more of Ru, Os, Rh, Ir, Pd, and Pt, wherein the fourth platinum group metal component more preferably comprises, more preferably consists of, Pt.

It is preferred that the third oxidic support material comprised in the second slurry provided in (e) of the process comprises Al, preferably Al and one or more of Si, Zr, Ti, and La, more preferably Al and Si, wherein the third oxidic support material more preferably comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica, wherein more preferably from 90 to 99 weight-%, more preferably from 92 to 97 weight-%, more preferably from 94 to 96 weight-%, of the alumina-silica or of the alumina-lanthana consist of alumina, calculated as $Al_2O_3$, based on the weight of the alumina-silica or on the weight of the alumina-lanthana, respectively, and wherein more preferably from 1 to 10 weight-%, more preferably from 3 to 8 weight-%, more preferably from 4 to 6 weight-%, of the alumina-silica consist of silica, calculated as $SiO_2$, based on the weight of the alumina-silica.

It is preferred that the third oxidic support material comprised in the second slurry provided in (e) of the process exhibits a BET specific surface area of higher than 150 $m^2/g$, wherein the BET specific surface area is more preferably determined according to Reference Example 1, wherein the third oxidic support material more preferably exhibits a total pore volume of higher than 0.5 ml/g, wherein the total pore volume is more preferably determined according to Reference Example 2.

It is preferred that the process comprises drying according to (c), wherein drying is performed in a gas atmosphere having a temperature in the range of from 80 to 140° C., more preferably in the range of from 100 to 120° C., more preferably for a duration in the range of from 0.25 to 3 hours, more preferably in the range of from 0.5 to 1.5 hours, wherein the gas atmosphere more preferably comprises, more preferably consists of one or more of oxygen, nitrogen, air and lean air.

It is preferred that calcining in (d) of the process is performed in a gas atmosphere having a temperature in the range of from 500 to 650° C., more preferably in the range of from 580 to 600° C., more preferably for a duration in the range of from 0.5 to 5 hours, more preferably in the range of from 1.5 to 2.5 hours, wherein the gas atmosphere more preferably comprises, more preferably consists of one or more of oxygen, nitrogen, air and lean air.

It is preferred that the process comprises drying according to (g), wherein drying is performed in a gas atmosphere having a temperature in the range of from 80 to 140° C., more preferably in the range of from 100 to 120° C., more preferably for a duration in the range of from 0.25 to 3 hours, more preferably in the range of from 0.5 to 1.5 hours, wherein the gas atmosphere more preferably comprises, more preferably consists of one or more of oxygen, nitrogen, air and lean air.

It is preferred that calcining in (h) of the process is performed in a gas atmosphere having a temperature in the range of from 500 to 650° C., more preferably in the range of from 580 to 600° C., more preferably for a duration in the range of from 0.5 to 5 hours, more preferably in the range of from 1.5 to 2.5 hours, wherein the gas atmosphere more preferably comprises, more preferably consists of one or more of oxygen, nitrogen, air and lean air.

Yet further, the present invention relates to a catalyst for the treatment of a diesel exhaust gas obtainable or obtained by a process according to any one of the embodiments disclosed herein.

Yet further, the present invention relates to a method for the treatment of an exhaust gas of a diesel combustion engine, comprising providing an exhaust gas from a diesel combustion engine and passing said exhaust gas through a catalyst according to any one of the embodiments disclosed herein.

Yet further, the present invention relates to a use of a catalyst according to any one of the embodiments disclosed herein for the treatment of an exhaust gas of a diesel combustion engine, said use comprising passing said exhaust gas through said catalyst.

The present invention is further illustrated by the following set of embodiments and combinations of embodiments resulting from the dependencies and back-references as indicated. In particular, it is noted that in each instance where a range of embodiments is mentioned, for example in the context of a term such as "any one of embodiments (1) to (4)", every embodiment in this range is meant to be explicitly disclosed for the skilled person, i.e. the wording of this term is to be understood by the skilled person as being synonymous to "any one of embodiments (1), (2), (3), and (4)". Further, it is explicitly noted that the following set of embodiments is not the set of claims determining the extent of protection, but represents a suitably structured part of the description directed to general and preferred aspects of the present invention.

According to an embodiment (1), the present invention relates to a catalyst, preferably a three-way diesel catalyst, for the treatment of a diesel exhaust gas, the catalyst comprising (i) a substrate comprising an inlet end, an outlet end, a substrate axial length extending from the inlet end to the outlet end of the substrate and a plurality of passages defined by internal walls of the substrate extending therethrough;

(ii) a first coating disposed on the surface of the internal walls of the substrate and extending over at least 50% of the axial length of the substrate from the inlet end toward the outlet end, wherein the first coating comprises a first platinum group metal component supported on a first oxidic support material, a second platinum group metal component supported on a second oxidic support material, wherein the first platinum group metal component is different to the second platinum group metal component, and a first oxygen storage compound, wherein at least 30 weight-% of the first oxygen storage compound consist of cerium oxide, calculated as $CeO_2$; and (iii) a second coating extending over at least 50% of the axial length of the substrate from the outlet end toward the inlet end and disposed either on the surface of the internal walls of the substrate, or on the surface of the internal walls of the substrate and the first coating, or on the first coating, wherein the second coating comprises a third platinum group metal component and a fourth platinum group metal component, wherein the third platinum group metal component and the fourth platinum group metal component are supported on a third oxidic support material, and wherein the third platinum group metal component is different to the fourth platinum group metal component.

Preferably, the present invention relates to a catalyst, preferably a three-way diesel catalyst, for the treatment of a diesel exhaust gas, the catalyst comprising (i) a substrate comprising an inlet end, an outlet end, a substrate axial length extending from the inlet end to the outlet end and a plurality of passages defined by internal walls of the substrate extending therethrough;

(ii) a first coating disposed on the surface of the internal walls of the substrate and extending over at least 55% of the axial length of the substrate from the inlet end toward the outlet end, the first coating comprising a first platinum group metal component supported on a first oxidic support material, a second platinum group metal component supported on a second oxidic support material, wherein the first platinum group metal component is different to the second platinum group metal component, and a first oxygen storage compound, wherein at least 30 weight-% of the first oxygen storage compound consist of cerium oxide, calculated as $CeO_2$; and (iii) a second coating at least partially disposed on the first coating and extending over at least 55% of the axial length of the substrate from the outlet end toward the inlet end, the second coating comprising a third platinum group metal component and a fourth platinum group metal component, wherein the third platinum group metal component and the fourth platinum group metal component are supported on a third oxidic support material, and wherein the third platinum group metal component is different to the fourth platinum group metal component.

A preferred embodiment (2) concretizing embodiment (1) relates to said catalyst, wherein the substrate comprises, preferably consists of, a ceramic and/or a metallic substance, preferably a ceramic substance, more preferably a ceramic substance which is one or more of alumina, silica, silicate, aluminosilicate, aluminotitanate, silicon carbide, cordierite, mullite, zirconia, spinel, magnesia, and titania, more preferably one or more of alpha-alumina, aluminotitanate, silicon carbide, and cordierite, more preferably one or more of aluminotitanate, silicon carbide, and cordierite, wherein more preferably the substrate comprises cordierite, more preferably consists of cordierite.

A further preferred embodiment (3) concretizing embodiment (1) or (2) relates to said catalyst, wherein the substrate is a monolith, more preferably a honeycomb monolith, wherein the honeycomb monolith is preferably a wall-flow or flow-through monolith, preferably a flow-through monolith.

A further preferred embodiment (4) concretizing any one of embodiments (1) to (3) relates to said catalyst, wherein the substrate has a total volume in the range of from 0.1 to 4 l, more preferably in the range of from 0.20 to 2.5 l, more preferably in the range of from 0.30 to 2.1 l, more preferably in the range of from 1.0 to 2.1 l.

A further preferred embodiment (5) concretizing any one of embodiments (1) to (4) relates to said catalyst, wherein the first coating extends from 50 to 100%, more preferably from 55 to 100%, more preferably from 60 to 100%, more preferably from 65 to 100%, of the axial length of the substrate from the inlet end toward the outlet end.

A further preferred embodiment (6) concretizing any one of embodiments (1) to (5) relates to said catalyst, wherein the first coating extends from 95 to 100%, more preferably from 98 to 100%, more preferably from 99 to 100%, of the axial length of the substrate from the inlet end toward the outlet end.

A further preferred embodiment (7) concretizing any one of embodiments (1) to (5) relates to said catalyst, wherein the first coating extends from 65 to 90%, more preferably from 65 to 80%, more preferably from 65 to 75%, of the axial length of the substrate from the inlet end toward the outlet end.

A further preferred embodiment (8) concretizing any one of embodiments (1) to (7) relates to said catalyst, wherein from 30 to 90 weight-%, more preferably from 32 to 80 weight-%, more preferably from 35 to 70 weight-%, more preferably from 40 to 55 weight-%, of the first oxygen storage component consist of cerium oxide, calculated as $CeO_2$, based on the weight of the first oxygen storage component.

A further preferred embodiment (9) concretizing any one of embodiments (1) to (8) relates to said catalyst, wherein the first oxygen storage component further comprises one or more of aluminum oxide and zirconium oxide, more preferably aluminum oxide or zirconium oxide.

A further preferred embodiment (10) concretizing any one of embodiments (1) to (9) relates to said catalyst, wherein at least 80 weight-%, more preferably at least 85 weight-%, more preferably at least 90 weight-%, more preferably from 90 to 100 weight-%, of the first oxygen storage component consist of cerium oxide, calculated as $CeO_2$, and one or more of aluminum oxide, calculated as $Al_2O_3$, and zirconium oxide, calculated as $ZrO_2$, based on the weight of the first oxygen storage component.

A further preferred embodiment (11) concretizing any one of embodiments (1) to (10) relates to said catalyst, wherein in the first oxygen storage component, the weight ratio of cerium oxide, calculated as $CeO_2$, to the one or more of aluminum oxide, calculated as $Al_2O_3$, and zirconium oxide, calculated as $ZrO_2$, is in the range of from 0.7:1 to 1.3:1, more preferably in the range of from 0.8:1 to 1.2:1, more preferably in the range of from 0.9:1 to 1.1:1.

A further preferred embodiment (12) concretizing any one of embodiments (1) to (11) relates to said catalyst, wherein the first oxygen storage component further comprises aluminum oxide, more preferably from 10 to 70 weight-%, more preferably from 30 to 65 weight-%, more preferably from 45 to 60 weight-%, aluminum oxide, calculated as $Al_2O_3$, based on the weight of the first oxygen storage component.

A further preferred embodiment (13) concretizing embodiment (12) relates to said catalyst, wherein from 95 to 100 weight-%, more preferably from 98 to 100 weight-%, more preferably from 99 to 100 weight-%, of the first oxygen storage component consist of cerium oxide, calculated as $CeO_2$, and aluminum oxide, calculated as $Al_2O_3$, based on the weight of the first oxygen storage component.

A further preferred embodiment (14) concretizing embodiment (12) or (13) relates to said catalyst, wherein the first oxygen storage component exhibits a zirconium content, calculated as $ZrO_2$, in the range of from 0 to 1 weight-%, more preferably in the range of from 0 to 0.5 weight %, more preferably in the range of from 0 to 0.1 weight-%, based on the weight of the first oxygen storage component.

A further preferred embodiment (15) concretizing any one of embodiments (1) to (11) relates to said catalyst, wherein the first oxygen storage component further comprises zirconium oxide, more preferably from 10 to 70 weight-%, more preferably from 30 to 65 weight-%, more preferably from 45 to 60 weight-%, zirconium oxide, calculated as $ZrO_2$, based on the weight of the first oxygen storage component.

A further preferred embodiment (16) concretizing embodiment (15) relates to said catalyst, wherein the first oxygen storage component further comprises one or more of lanthanum oxide and praseodymium oxide, wherein the first oxygen storage component preferably further comprises lanthanum oxide and praseodymium oxide.

A further preferred embodiment (17) concretizing embodiment (15) or (16) relates to said catalyst, wherein from 5 to 15 weight-%, more preferably from 7 to 13 weight-%, more preferably from 9 to 11 weight-%, of the first oxygen storage component consist of lanthanum oxide, calculated as $La_2O_3$, and praseodymium oxide, calculated as $Pr_6O_{11}$, based on the weight of the first oxygen storage component.

A further preferred embodiment (18) concretizing any one of embodiments (15) to (17) relates to said catalyst, wherein from 95 to 100 weight-%, more preferably from 98 to 100 weight-%, more preferably from 99 to 100 weight-%, of the first oxygen storage component consist of cerium oxide, calculated as $CeO_2$, zirconium oxide, calculated as $ZrO_2$, and preferably one or more of lanthanum oxide, calculated as $La_2O_3$, and praseodymium oxide, calculated as $Pr_6O_{11}$, based on the weight of the first oxygen storage component.

A further preferred embodiment (19) concretizing any one of embodiments (15) to (18) relates to said catalyst, wherein the first oxygen storage component exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the first oxygen storage component.

A further preferred embodiment (20) concretizing any one of embodiments (15) to (19) relates to said catalyst, wherein the first oxygen storage component exhibits a neodymium content, calculated as $Nd_2O_3$, in the range of from 0 to 1 weight-%, more preferably in the range of from 0 to 0.5 weight-%, more preferably in the range of from 0 to 0.1 weight-%, based on the weight of the first oxygen storage component.

A further preferred embodiment (21) concretizing any one of embodiments (15) to (20) relates to said catalyst, comprising the first oxygen storage component at a loading in the range of from 0.01 to 1 g/in$^3$, more preferably in the range of from 0.1 to 0.8 g/in$^3$, more preferably in the range of from 0.2 to 0.7 g/in$^3$, more preferably in the range of from 0.25 to 0.65 g/in$^3$, more preferably in the range of from 0.27 to 0.61 g/in$^3$.

A further preferred embodiment (22) concretizing any one of embodiments (1) to (21) relates to said catalyst, preferably insofar as embodiment (22) depends on any one of embodiments (15) to (21), the catalyst further comprising, in the first coating, a second oxygen storage component different from the first oxygen storage component, said second oxygen storage component comprising cerium oxide, more preferably at most 50 weight-% of cerium oxide, calculated as $CeO_2$, based on the weight of the second oxygen storage component.

A further preferred embodiment (23) concretizing embodiment (22) relates to said catalyst, wherein from 15 to 50 weight-%, more preferably from 20 to 40 weight-%, more preferably from 25 to 35 weight-%, more preferably from 26 to 30 weight-%, more preferably from 27 to 29 weight-%, of the second oxygen storage component consist of cerium oxide, calculated as $CeO_2$, based on the weight of the second oxygen storage component.

A further preferred embodiment (24) concretizing embodiment (22) or (23) relates to said catalyst, wherein the second oxygen storage component further comprises one or more of aluminum oxide and zirconium oxide, more preferably zirconium oxide.

A further preferred embodiment (25) concretizing any one of embodiments (22) to (24) relates to said catalyst, wherein the second oxygen storage component comprises from 45 to 80 weight %, more preferably from 50 to 70 weight-%, more preferably from 55 to 60 weight-%, of zirconium oxide, calculated as $ZrO_2$, based on the weight of the second oxygen storage component.

A further preferred embodiment (26) concretizing embodiment (22) to (25) relates to said catalyst, wherein the second oxygen storage component further comprises one or more of lanthanum oxide, praseodymium oxide, and neodymium oxide, wherein the second oxygen storage component more preferably further comprises lanthanum oxide, praseodymium oxide and neodymium oxide.

A further preferred embodiment (27) concretizing embodiment (25) or (26) relates to said catalyst, wherein from 10 to 20 weight-%, more preferably from 12 to 18 weight-%, more preferably from 14 to 16 weight-%, of the second oxygen storage component consist of lanthanum oxide, calculated as $La_2O_3$, praseodymium oxide, calculated as $Pr_6O_{11}$, and neodymium oxide, calculated as $Nd_2O_3$, based on the weight of the second oxygen storage component.

A further preferred embodiment (28) concretizing any one of embodiments (25) to (27) relates to said catalyst, wherein from 95 to 100 weight-%, more preferably from 98 to 100 weight-%, more preferably from 99 to 100 weight-%, of the second oxygen storage component consist of cerium oxide, calculated as $CeO_2$, zirconium oxide, calculated as $ZrO_2$, and more preferably one or more of lanthanum oxide, calculated as $La_2O_3$, and praseodymium oxide, calculated as $Pr_6O_{11}$, and neodymium oxide, calculated as $Nd_2O_3$, based on the weight of the second oxygen storage component.

A further preferred embodiment (29) concretizing any one of embodiments (25) to (28) relates to said catalyst, wherein the second oxygen storage component exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the second oxygen storage component.

A further preferred embodiment (30) concretizing any one of embodiments (25) to (29), comprising the second oxygen storage component at a loading in the range of from 0.01 to 0.50 g/in$^3$, more preferably in the range of from 0.05 to 0.40 g/in$^3$, more preferably in the range of from 0.10 to 0.35 g/in$^3$, more preferably in the range of from 0.13 to 0.30 g/in$^3$.

A further preferred embodiment (31) concretizing any one of embodiments (1) to (30) relates to said catalyst, wherein the first platinum group metal component comprises, more preferably consists of, one more of Ru, Os, Rh, Ir, Pd, and Pt, more preferably one or more of Rh and Pd, wherein the first platinum group metal component more preferably comprises, more preferably consists of, Pd.

A further preferred embodiment (32) concretizing any one of embodiments (1) to (31) relates to said catalyst, wherein the first coating according to (ii) comprises the first platinum group metal component at a loading in the range of from 5 to 85 g/ft$^3$, more preferably in the range of from 25 to 65 g/ft$^3$, more preferably in the range of from 30 to 55 g/ft$^3$.

A further preferred embodiment (33) concretizing any one of embodiments (1) to (32) relates to said catalyst, wherein the first oxidic support material comprises Al, more preferably Al and one or more of Si, Zr, Ti, and La, more preferably Al and Si or more preferably Al and La.

A further preferred embodiment (34) concretizing any one of embodiments (1) to (33) relates to said catalyst, wherein the first oxidic support material exhibits a BET specific surface area of higher than 140 m$^2$/g, wherein the BET specific surface area is more preferably determined according to Reference Example 1.

A further preferred embodiment (35) concretizing any one of embodiments (1) to (34) relates to said catalyst, wherein the first oxidic support material exhibits a total pore volume of higher than 0.5 ml/g, wherein the total pore volume is more preferably determined according to Reference Example 2.

A further preferred embodiment (36) concretizing any one of embodiments (1) to (35) relates to said catalyst, wherein the first oxidic support material comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica or alumina-lanthana.

A further preferred embodiment (37) concretizing embodiment (36) relates to said catalyst, wherein from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively.

A further preferred embodiment (38) concretizing embodiment (36) or (37) relates to said catalyst, wherein from 1 to 10 weight-%, more preferably from 3 to 8 weight-%, more preferably from 4 to 7 weight-%, of the alumina-silica consist of silica, calculated as $SiO_2$, based on the weight of the alumina-silica.

A further preferred embodiment (39) concretizing embodiment (36) or (37) relates to said catalyst, wherein from 1 to 10 weight-%, more preferably from 3 to 8 weight-%, more preferably from 4 to 7 weight-%, of the alumina-lanthana consist of lanthana, calculated as $La_2O_3$, based on the weight of the alumina-lanthana.

A further preferred embodiment (40) concretizing any one of embodiments (1) to (39) relates to said catalyst, comprising the first oxidic support material at a loading in the range of from 0.3 to 1.6 g/in$^3$, more preferably in the range of from 0.45 to 1.4 g/in$^3$, more preferably in the range of from 0.8 to 1.2 g/in$^3$.

A further preferred embodiment (41) concretizing any one of embodiments (1) to (40) relates to said catalyst, wherein the second platinum group metal component comprises, preferably consists of, one or more of Ru, Os, Rh, Ir, Pd, and Pt, more preferably one or more of Rh and Pd, wherein the second platinum group metal component more preferably comprises, more preferably consists of, Rh.

A further preferred embodiment (42) concretizing any one of embodiments (1) to (41) relates to said catalyst, wherein the first coating according to (ii) comprises the second platinum group metal component in the range of from 1 to 9 g/ft$^3$, more preferably in the range of from 2.4 to 7 g/ft$^3$, more preferably in the range of from 4.9 to 5.1 g/ft$^3$.

A further preferred embodiment (43) concretizing any one of embodiments (1) to (42) relates to said catalyst, wherein the second oxidic support material comprises Al, more preferably Al and one or more of Si, Zr, Ti, and La, more preferably Al, Zr, and La.

A further preferred embodiment (44) concretizing any one of embodiments (1) to (43) relates to said catalyst, wherein the second oxidic support material comprises, more preferably consists of, one or more of alumina, zirconia, lanthana, alumina-zirconia, alumina-lanthana, zirconia-lanthana, and alumina-zirconia-lanthana, more preferably alumina-zirconia-lanthana.

A further preferred embodiment (45) concretizing embodiment (44) relates to said catalyst, wherein from 68 to 84 weight-%, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana.

A further preferred embodiment (46) concretizing embodiment (44) or (45) relates to said catalyst, wherein from 15 to 25 weight-%, more preferably from 17 to 23 weight-%, more preferably from 19 to 21 weight-%, of the alumina-zirconia-lanthana consist of zirconia, calculated as $ZrO_2$, based on the weight of the alumina-zirconia-lanthana.

A further preferred embodiment (47) concretizing any one of embodiments (44) to (46) relates to said catalyst, wherein from 1 to 7 weight-%, more preferably from 2 to 6 weight-%, more preferably from 3 to 5 weight-%, of the alumina-zirconia-lanthana consist of lanthana, calculated as $La_2O_3$, based on the weight of the alumina-zirconia-lanthana.

A further preferred embodiment (48) concretizing any one of embodiments (1) to (47) relates to said catalyst, comprising the second oxidic support material at a loading in the range of from 0.10 to 0.75 g/in$^3$, more preferably in the range of from 0.20 to 0.65 g/in$^3$, more preferably in the range of from 0.30 to 0.60 g/in$^3$.

A further preferred embodiment (49) concretizing any one of embodiments (1) to (48) relates to said catalyst, wherein the second oxidic support material exhibits a BET specific surface area of higher than 130 m$^2$/g, wherein the BET specific surface area is more preferably determined according to Reference Example 1.

A further preferred embodiment (50) concretizing any one of embodiments (1) to (49) relates to said catalyst, wherein the second oxidic support material exhibits a total pore volume of higher than 0.6 ml/g, wherein the total pore volume is more preferably determined according to Reference Example 2.

A further preferred embodiment (51) concretizing any one of embodiments (1) to (50) relates to said catalyst, further comprising, in the first coating, a fifth platinum group metal component supported on a zeolitic material.

A further preferred embodiment (52) concretizing embodiment (51) relates to said catalyst, wherein the fifth platinum group metal component comprises, preferably consists of, one more of Ru, Os, Rh, Ir, Pd, and Pt, more preferably one or more of Rh and Pd, wherein the fifth platinum group metal component more preferably comprises, more preferably consists of, Pd.

A further preferred embodiment (53) concretizing embodiment (51) or (52) relates to said catalyst, wherein the first coating according to (ii) comprises the fifth platinum group metal component at a loading in the range of from 5 to 85 g/ft$^3$, more preferably in the range of from 25 to 65 g/ft$^3$, more preferably in the range of from 30 to 55 g/ft$^3$.

A further preferred embodiment (54) concretizing any one of embodiments (51) to (53) relates to said catalyst, wherein the zeolitic material comprises the fifth platinum group metal component in an amount in the range of from 1.0 to 2.5 weight-%, more preferably in the range of from 1.4 to 2.0 weight-%, more preferably in the range of from 1.6 to 1.8 weight-%, based on the weight of the zeolitic material.

A further preferred embodiment (55) concretizing any one of embodiments (51) to (54) relates to said catalyst, wherein the framework structure of the zeolitic material comprises a tetravalent element Y, a trivalent element X and oxygen, wherein the tetravalent element Y is more preferably selected from the group consisting of Si, Sn, Ti, Zr, Ge, and a mixture of two or more thereof, more preferably from the group consisting of Si, Ti, and a mixture of two or more thereof, wherein more preferably the tetravalent element Y is Si and/or Ti, and wherein the trivalent element X is more preferably selected from the group consisting of B, Al, Ga, In, and a mixture of two or more thereof, preferably from the group consisting of B, Al, and a mixture of two or more thereof, wherein more preferably the tetravalent element Y is B and/or Al.

A further preferred embodiment (56) concretizing any one of embodiments (51) to (55) relates to said catalyst, wherein the zeolitic material comprises, more preferably consists of, a 10 or more-membered ring pore zeolitic material, wherein the zeolitic material more preferably comprises, more preferably consists of, one or more of a 10-membered ring pore zeolitic material and a 12-membered ring pore zeolitic material.

A further preferred embodiment (57) concretizing any one of embodiments (51) to (56) relates to said catalyst, wherein the zeolitic material exhibits a molar ratio of Y to X, calculated as $YO_2:X_2O_3$, in the range of from 5:1 to 50:1, more preferably in the range of from 15:1 to 30:1, more preferably in the range of from 19:1 to 23:1.

A further preferred embodiment (58) concretizing any one of embodiments (51) to (57) relates to said catalyst, wherein from 95 to 100 weight-%, more preferably from 97 to 100 weight-%, more preferably from 99 to 100 weight-%, of the zeolitic material consists of Y, X, 0, and H, based on the weight of the zeolitic material.

A further preferred embodiment (59) concretizing any one of embodiments (51) to (58) relates to said catalyst, wherein the zeolitic material has a framework type selected from the group consisting of AEL, AFO, BEA, CHA, FAU, FER, HEU, GIS, GME, LEV, LTA, MOR, MTT, MEL, MFS, MFI, MWW, OFF, RRO, SZR, TON, USY, a mixture of two or more thereof and a mixed type of two or more thereof, more preferably selected from the group consisting of BEA, FAU, FER, GIS, LTA, MEL, MWW, MFS, MFI, MOR, MTT, TON, a mixture of two or more thereof and a mixed type of two or more thereof, more preferably selected from the group consisting of BEA, FAU, FER, GIS, and MFI, wherein more preferably the zeolitic material has a FER framework type.

A further preferred embodiment (60) concretizing any one of embodiments (51) to (59) relates to said catalyst, comprising the zeolitic material at a loading in the range of from 1.5 to 2.5 g/in$^3$, more preferably in the range of from 1.8 to 2.2 g/in$^3$, more preferably in the range of from 1.9 to 2.1 g/in$^3$.

A further preferred embodiment (61) concretizing any one of embodiments (1) to (60) relates to said catalyst, further comprising, in the first coating, barium oxide, more preferably at a loading in the range of from 0.03 to 0.11 g/in$^3$, more preferably in the range of from 0.05 to 0.09 g/in$^3$, more preferably in the range of from 0.06 to 0.08 g/in$^3$, calculated as BaO.

A further preferred embodiment (62) concretizing any one of embodiments (1) to (61) relates to said catalyst, further comprising, in the first coating, zirconium oxide, more preferably at a loading in the range of from 0.05 to 0.15 g/in$^3$, more preferably in the range of from 0.08 to 0.12 g/in$^3$, more preferably in the range of from 0.09 to 0.11 g/in$^3$, calculated as $ZrO_2$.

A further preferred embodiment (63) concretizing any one of embodiments (1) to (62) relates to said catalyst, wherein the first coating comprises from 0 to 0.1 weight-%, more preferably from 0 to 0.01 weight-%, more preferably from 0 to 0.001 weight-%, of Pt calculated as elemental Pt, wherein the first coating is more preferably essentially free of Pt, wherein the first coating more preferably is free of Pt.

A further preferred embodiment (64) concretizing any one of embodiments (1) to (63) relates to said catalyst, wherein from 95 to 100 weight-%, more preferably from 97 to 100 weight-%, more preferably from 99 to 100 weight-%, of the first coating consist of the first platinum group metal component, the first oxidic support material, the second platinum group metal component, the second oxidic support material, the first oxygen storage component, optionally the second oxygen storage material, optionally the fifth platinum group metal component, optionally the zeolitic material, optionally barium oxide, and optionally zirconium oxide, wherein more preferably from 95 to 100 weight-%, more preferably from 97 to 100 weight-%, more preferably from 99 to 100 weight-%, of the first coating consist of the first platinum group metal component, the first oxidic support material, the second platinum group metal component, the second oxidic support material, the first oxygen storage component, optionally the second oxygen storage material, optionally the fifth platinum group metal component, optionally the zeolitic material, barium oxide, and optionally zirconium oxide, wherein more preferably from 95 to 100 weight-%, more preferably from 97 to 100 weight-%, more preferably from 99 to 100 weight-%, of the first coating consist of the first platinum group metal component, the first oxidic support material, the second platinum group metal component, the second oxidic support material, the first oxygen storage component, optionally the second oxygen storage material, optionally the fifth platinum group metal component, the zeolitic material, optionally barium oxide, and zirconium oxide.

A further preferred embodiment (65) concretizing any one of embodiments (1) to (64) relates to said catalyst, wherein the second coating extends over 50 to 100%, more preferably over 55 to 100%, more preferably over 60 to 100%, more preferably over 65 to 100%, of the axial length of the substrate from the outlet end toward the inlet end of the substrate.

A further preferred embodiment (66) concretizing embodiment (65) relates to said catalyst, wherein the second coating extends over 95 to 100%, more preferably over 98 to 100%, more preferably over 99 to 100%, of the axial length of the substrate from the outlet end toward the inlet end of the substrate.

A further preferred embodiment (67) concretizing embodiment (65) relates to said catalyst, wherein the second coating extends over 65 to 90%, more preferably over 65 to 80%, more preferably over 65 to 75%, of the axial length of the substrate from the outlet end toward the inlet end of the substrate.

A further preferred embodiment (68) concretizing any one of embodiments (1) to (67) relates to said catalyst, wherein the third platinum group metal component comprises, more preferably consists of, one more of Ru, Os, Rh, Ir, Pd, and Pt, wherein the third platinum group metal component more preferably comprises, more preferably consists of, Pd.

A further preferred embodiment (69) concretizing any one of embodiments (1) to (68) relates to said catalyst, wherein the fourth platinum group metal component comprises, more preferably consists of, one more of Ru, Os, Rh, Ir, Pd, and Pt, wherein the fourth platinum group metal component more preferably comprises, more preferably consists of, Pt.

A further preferred embodiment (70) concretizing any one of embodiments (1) to (69) relates to said catalyst, wherein the weight ratio of the third platinum group metal component to the fourth platinum group metal component is in the range of from 1:1 to 20:1, more preferably in the range of from 4:1 to 12:1, more preferably in the range of from 7:1 to 9:1.

A further preferred embodiment (71) concretizing any one of embodiments (1) to (70) relates to said catalyst, wherein the second coating according to (iii) comprises the third platinum group metal component at a loading in the range of from 5 to 40 g/ft$^3$, more preferably in the range of from 7 to 15 g/ft$^3$, more preferably in the range of from 10 to 13 g/ft$^3$.

A further preferred embodiment (72) concretizing any one of embodiments (1) to (71) relates to said catalyst, wherein the second coating according to (iii) comprises the fourth platinum group metal component at a loading in the range of from 55 to 110 g/ft$^3$, more preferably in the range of from 80 to 105 g/ft$^3$, more preferably in the range of from 88 to 100 g/ft$^3$.

A further preferred embodiment (73) concretizing any one of embodiments (1) to (72) relates to said catalyst, wherein the third oxidic support material comprises Al, more preferably Al and one or more of Si, Zr, Ti, and La, more preferably Al and Si.

A further preferred embodiment (74) concretizing any one of embodiments (1) to (73) relates to said catalyst, wherein the third oxidic support material comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica.

A further preferred embodiment (75) concretizing embodiment (74) relates to said catalyst, wherein from 90 to 99 weight-%, more preferably from 92 to 97 weight-%, more preferably from 94 to 96 weight-%, of the alumina-silica or of the alumina-lanthana consist of alumina, calculates as $Al_2O_3$, based on the weight of the alumina-silica or on the weight of the alumina-lanthana, respectively.

A further preferred embodiment (76) concretizing embodiment (74) or (75) relates to said catalyst, wherein from 1 to 10 weight-%, more preferably from 3 to 8 weight-%, more preferably from 4 to 6 weight-%, of the alumina-silica consist of silica, calculates as $SiO_2$, based on the weight of the alumina-silica.

A further preferred embodiment (77) concretizing any one of embodiments (1) to (76) relates to said catalyst, comprising the third oxidic support material at a loading in the range of from 0.5 to 3.5 g/in$^3$, more preferably in the range of from 1.2 to 3.0 g/in$^3$, more preferably in the range of from 1.4 to 2.7 g/in$^3$.

A further preferred embodiment (78) concretizing any one of embodiments (1) to (77) relates to said catalyst, wherein the third oxidic support material exhibits a BET specific surface area of higher than 150 m$^2$/g, wherein the BET specific surface area is more preferably determined according to Reference Example 1.

A further preferred embodiment (79) concretizing any one of embodiments (1) to (78) relates to said catalyst, wherein the third oxidic support material exhibits a total pore volume of higher than 0.5 ml/g, wherein the total pore volume is more preferably determined according to Reference Example 2.

A further preferred embodiment (80) concretizing any one of embodiments (1) to (79) relates to said catalyst, wherein the second coating comprises from 0 to 0.1 weight-%, more preferably from 0 to 0.01 weight-%, more preferably from 0 to 0.001 weight-%, of an oxygen storage component, preferably of an oxygen storage component as defined in any one of embodiments 12 to 30, wherein the second coating is preferably essentially free of an oxygen storage component, wherein the second coating more more preferably is free of an oxygen storage component.

A further preferred embodiment (81) concretizing any one of embodiments (1) to (80) relates to said catalyst, wherein the second coating comprises from 0 to 1 weight-%, preferably from 0 to 0.1 weight-%, more preferably from 0 to 0.01 weight-%, of a zeolitic material, more preferably the zeolitic material as defined in any one of embodiments 47 to 55, wherein the second coating is more preferably essentially free of a zeolitic material, wherein the second coating more preferably is free of a zeolitic material.

A further preferred embodiment (82) concretizing any one of embodiments (1) to (81) relates to said catalyst, wherein from 95 to 100 weight-%, more preferably from 97 to 100 weight-%, more preferably from 99 to 100 weight-%, of the second coating consist of the third platinum group metal component, the fourth platinum group metal component, and the third oxidic support material.

A further preferred embodiment (83) concretizing any one of embodiments (1) to (82) relates to said catalyst, wherein the first coating is different to the second coating.

A further preferred embodiment (84) concretizing any one of embodiments (1) to (83) relates to said catalyst, wherein the sum of the loading of the first platinum group metal component, the loading of the third platinum group metal component, and optionally the loading of the fifth platinum group metal component, is in the range of from 10 to 125 g/ft$^3$, more preferably in the range of from 30 to 80 g/ft$^3$, more preferably in the range of from 40 to 67 g/ft$^3$.

It is preferred that the first platinum group metal component, the second platinum group metal component, the third platinum group metal component, the fourth platinum group metal component, and the fifth platinum group metal component independently from each other comprises, more preferably consists of, one more of Ru, Os, Rh, Ir, Pd, and Pt.

A further preferred embodiment (85) concretizing any one of embodiments (1) to (84) relates to said catalyst, having a loading of the second platinum group metal component in the range of from 1 to 9 g/ft$^3$, more preferably in the range of from 2.4 to 7 g/ft$^3$, more preferably in the range of from 4.9 to 5.1 g/ft$^3$.

A further preferred embodiment (86) concretizing any one of embodiments (1) to (85) relates to said catalyst, having a loading of the fourth platinum group metal component in the range of from 55 to 110 g/ft$^3$, more preferably in the range of from 80 to 105 g/ft$^3$, more preferably in the range of from 88 to 100 g/ft$^3$.

A further preferred embodiment (87) concretizing any one of embodiments (1) to (86) relates to said catalyst, consisting of the substrate according to (i), the first coating according to (ii) and the second coating according to (iii).

An embodiment (88) of the present invention relates to a process for the preparation of a catalyst, more preferably of a catalyst according to any one of embodiments (1) to (87), said process comprising (a) providing a substrate comprising an inlet end, an outlet end, a substrate axial length extending from the inlet end to the outlet end of the substrate and a plurality of passages defined by internal walls of the substrate extending therethrough, and a first slurry comprising water, a first platinum group metal component supported on a first oxidic support material, a second platinum group metal component supported on a second oxidic support material, wherein the first platinum group metal component is different to the second platinum group metal component, a first oxygen storage compound, optionally a second oxygen storage component, optionally a fifth platinum group metal component supported on a zeolitic material, optionally a source of BaO, and optionally a source of $ZrO_2$;

(b) disposing the first slurry on the internal walls of the substrate from the inlet end toward the outlet end over at least 50% of the substrate axial length; obtaining a substrate having a first coating disposed thereon;

(c) optionally drying of the substrate having a first coating disposed thereon obtained in (b) in a gas atmosphere;

(d) calcining of the substrate having a first coating disposed thereon obtained in (b), or (c), in a gas atmosphere, obtaining a calcined substrate having a first coating disposed thereon;

(e) providing a second slurry comprising water, a third platinum group metal component and a fourth platinum group metal component, wherein the third platinum group metal component and the fourth platinum group metal component are supported on a third oxidic support material, wherein the third platinum group metal component is different to the fourth platinum group metal component;

(f) disposing the second slurry on the substrate having a first coating disposed thereon from the outlet end toward the inlet end the substrate over at least 50% of the substrate axial length; obtaining a substrate having a first and a second coating disposed thereon;

(g) optionally drying of the substrate having a first and a second coating disposed thereon obtained in (f) in a gas atmosphere;

(h) calcining of the substrate having a first and a second coating disposed thereon obtained in (f), or (g), in a gas atmosphere; obtaining the catalyst.

A further preferred embodiment (89) concretizing embodiment (88) relates to said process, wherein providing the first slurry in (a) comprises (a.1) mixing of water, a first platinum group metal component supported on a first oxidic support material, a first oxygen storage compound, and optionally a second oxygen storage component;

(a.2) mixing of water, a second platinum group metal component supported on a second oxidic support material, wherein the first platinum group metal component is different to the second platinum group metal component, optionally a fifth platinum group metal component supported on a zeolitic material, optionally a source of BaO, and optionally a source of $ZrO_2$;

(a.3) mixing of the mixture obtained in (a.1) and the mixture obtained in (a.2).

A further preferred embodiment (90) concretizing embodiment (88) or (89) relates to said process, wherein the substrate provided in (a) comprises a ceramic and/or a metallic substance, more preferably a ceramic substance, more preferably a ceramic substance which is one or more of alumina, silica, silicate, aluminosilicate, aluminotitanate, silicon carbide, cordierite, mullite, zirconia, spinel, magnesia, and titania, more preferably one or more of alpha-alumina, aluminotitanate, silicon carbide, and cordierite, more preferably one or more of aluminotitanate, silicon carbide, and cordierite, wherein more preferably the substrate comprises cordierite, more preferably consists of cordierite.

A further preferred embodiment (91) concretizing any one of embodiments (88) to (90) relates to said process, wherein the substrate provided in (a) is a monolith, more preferably a honeycomb monolith, wherein the honeycomb monolith is more preferably a wall-flow or flow-through monolith, preferably a flow-through monolith.

A further preferred embodiment (92) concretizing any one of embodiments (88) to (91) relates to said process, wherein the substrate has a total volume in the range of from 0.1 to 4 l, more preferably in the range of from 0.20 to 2.5 l, more preferably in the range of from 0.30 to 2.1 l, more preferably in the range of from 1.0 to 2.1 l.

A further preferred embodiment (93) concretizing any one of embodiments (88) to (92) relates to said process, wherein the first slurry is disposed on the internal walls of the substrate from the inlet end toward the outlet end of the substrate over 50 to 100%, more preferably over 55 to 100%, more preferably over 60 to 100%, more preferably over 65 to 100%, of the substrate axial length.

A further preferred embodiment (94) concretizing embodiment (93) relates to said process, wherein the first slurry is disposed on the internal walls of the substrate from the inlet end toward the outlet end of the substrate over 95 to 100%, more preferably over 98 to 100%, more preferably over 99 to 100%, of the substrate axial length.

A further preferred embodiment (95) concretizing embodiment (93) relates to said process, wherein the first slurry is disposed on the internal walls of the substrate from the inlet end toward the outlet end of the substrate over 65 to 90%, more preferably over 65 to 80%, more preferably over 65 to 75%, of the substrate axial length.

A further preferred embodiment (96) concretizing any one of embodiments (88) to (95) relates to said process, wherein from 30 to 90 weight-%, more preferably from 32 to 80 weight-%, more preferably from 35 to 70 weight-%, more preferably from 40 to 55 weight-%, of the first oxygen storage component consist of cerium oxide, calculated as $CeO_2$, based on the weight of the first oxygen storage component.

A further preferred embodiment (97) concretizing any one of embodiments (88) to (96) relates to said process, wherein the first oxygen storage component further comprises one or more of aluminum oxide and zirconium oxide, more preferably aluminum oxide or zirconium oxide, wherein more preferably at least 80 weight-%, more preferably at least 85 weight-%, more preferably at least 90 weight-%, more preferably from 90 to 100 weight-%, of the first oxygen storage component consist of cerium oxide, calculated as $CeO_2$, and one or more of aluminum oxide, calculated as $Al_2O_3$, and zirconium oxide, calculated as $ZrO_2$, based on the weight of the first oxygen storage component.

A further preferred embodiment (98) concretizing any one of embodiments (88) to (97) relates to said process, wherein the first oxygen storage component further comprises aluminum oxide, wherein the first oxygen storage component comprises more preferably from 10 to 70 weight-%, more preferably from 30 to 65 weight-%, more preferably from 45 to 60 weight-% of aluminum oxide, calculated as $Al_2O_3$, based on the weight of the first oxygen storage component, wherein more preferably from 95 to 100 weight-%, more preferably from 98 to 100 weight-%, more preferably from 99 to 100 weight-%, of the first oxygen storage component consist of cerium oxide, calculated as $CeO_2$, and aluminum oxide, calculated as $Al_2O_3$, based on the weight of the first oxygen storage component, wherein the first oxygen storage component more preferably exhibits a zirconium content, calculated as $ZrO_2$, in the range of from 0 to 1 weight-%, preferably in the range of from 0 to 0.5 weight-%, more preferably in the range of from 0 to 0.1 weight-%, based on the weight of the first oxygen storage component.

A further preferred embodiment (99) concretizing any one of embodiments (88) to (97) relates to said process, wherein the first oxygen storage component further comprises zirconium oxide, more preferably from 10 to 70 weight-%, more preferably from 30 to 65 weight-%, more preferably from 45 to 60 weight-%, of zirconium oxide, calculated as $ZrO_2$, based on the weight of the first oxygen storage component, wherein the first oxygen storage component more preferably further comprises one or more of lanthanum oxide and praseodymium, wherein the first oxygen storage component more preferably further comprises lanthanum oxide and praseodymium oxide, wherein preferably from 5 to 15 weight-%, more preferably from 7 to 13 weight-%, more preferably from 9 to 11 weight-%, of the first oxygen storage component consist of lanthanum oxide, calculated as $La_2O_3$, and praseodymium oxide, calculated as $Pr_6O_{11}$, based on the weight of the first oxygen storage component.

A further preferred embodiment (100) concretizing embodiment (99) relates to said process, wherein from 95 to 100 weight-%, more preferably from 98 to 100 weight-%, more preferably from 99 to 100 weight-%, of the first oxygen storage component consist of cerium oxide, calculated as $CeO_2$, zirconium oxide, calculated as $ZrO_2$, and preferably of one or more of lanthanum oxide, calculated as $La_2O_3$ and praseodymium oxide, calculated as $Pr_6O_{11}$, based on the weight of the first oxygen storage component, wherein the first oxygen storage component more preferably exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the first oxygen storage component, wherein the first oxygen storage component more preferably exhibits a neodymium content, calculated as $Nd_2O_3$, in the range of from 0 to 1 weight-%, more preferably in the range of from 0 to 0.5 weight-%, more preferably in the range of from 0 to 0.1 weight-%, based on the weight of the first oxygen storage component.

A further preferred embodiment (101) concretizing any one of embodiments (88) to (100) relates to said process, wherein the second oxygen storage component is comprised in the first slurry, wherein the second oxygen storage component is different from the first oxygen storage component, said second oxygen storage component comprising cerium oxide, more preferably at most 50 weight-% of cerium oxide, calculated as $CeO_2$, wherein preferably from 15 to 50 weight-%, more preferably from 20 to 40 weight-%, more preferably from 25 to 35 weight-%, more preferably from 26 to 30 weight-%, more preferably from 27 to 29 weight-%, of the second oxygen storage component consist of cerium oxide, calculated as $CeO_2$, based on the weight of the second oxygen storage component.

A further preferred embodiment (102) concretizing embodiment (101) relates to said process, wherein the second oxygen storage component further comprises one or more of aluminum oxide and zirconium oxide, more preferably zirconium oxide, wherein the second oxygen storage component more preferably comprises from 45 to 80 weight-%, more preferably from 50 to 70 weight-%, more preferably from 55 to 60 weight-%, of zirconium oxide, calculated as $ZrO_2$, based on the weight of the second oxygen storage component, wherein the second oxygen storage component more preferably further comprises one or more of lanthanum oxide, praseodymium oxide, and neodymium oxide, wherein the second oxygen storage component more preferably further comprises lanthanum oxide, praseodymium oxide and neodymium oxide, wherein more preferably from 10 to 20 weight-%, more preferably from 12 to 18 weight-%, more preferably from 14 to 16 weight-%, of the second oxygen storage component consist of lanthanum oxide, calculated as $La_2O_3$, praseodymium oxide, calculated as $Pr_6O_{11}$, and neodymium oxide, calculated as $Nd_2O_3$, based on the weight of the second oxygen storage component.

A further preferred embodiment (103) concretizing embodiment (101) or (102) relates to said process, wherein from 95 to 100 weight-%, more preferably from 98 to 100 weight-%, more preferably from 99 to 100 weight-%, of the second oxygen storage component consist of cerium oxide, calculated as $CeO_2$, zirconium oxide, calculated as $ZrO_2$, and more preferably one or more of lanthanum oxide, calculated as $La_2O_3$, and praseodymium oxide, calculated as $Pr_6O_{11}$, and neodymium oxide, calculated as $Nd_2O_3$, based on the weight of the second oxygen storage component, wherein the second oxygen storage component more preferably exhibits an aluminum content, calculated as $Al_2O_3$, in the range of from 0 to 1 weight-%, more preferably in the range of from 0 to 0.5 weight-%, more preferably in the range of from 0 to 0.1 weight-%, based on the weight of the second oxygen storage component.

A further preferred embodiment (104) concretizing any one of embodiments (88) to (103) relates to said process, wherein the first platinum group metal component supported on a first oxidic support material comprised in the first slurry provided in (a) is prepared by impregnating the first oxidic support material with a source of the first platinum group metal component.

A further preferred embodiment (105) concretizing embodiment (104) relates to said process, wherein the source of the first platinum group metal component is selected from the group consisting of organic and inorganic salts of the first platinum group metal component, wherein the source of the first platinum group metal component more preferably comprises a nitrate of the first platinum group metal component.

A further preferred embodiment (106) concretizing any one of embodiments (88) to (104) relates to said process, wherein the first platinum group metal component supported on a first oxidic support material is dispersed in the first slurry with an acid, more preferably acetic acid or nitric acid, wherein the first slurry more preferably has a pH in the range of from 3 to 5.

A further preferred embodiment (107) concretizing any one of embodiments (88) to (106) relates to said process, wherein the first platinum group metal component comprises, more preferably consists of, one more of Ru, Os, Rh, Ir, Pd, and Pt, more preferably one or more of Rh and Pd, wherein the first platinum group metal component more preferably comprises, more preferably consists of, Pd.

A further preferred embodiment (108) concretizing any one of embodiments (88) to (107) relates to said process, wherein the first oxidic support material comprises Al, more preferably Al and one or more of Si, Zr, Ti, and La, more preferably Al and Si or more preferably Al and La, wherein the first oxidic support material more preferably comprises one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, more preferably one or more of alumina, silica, lanthana, alumina-silica, alumina-lanthana, and silica-lanthana, more preferably alumina-silica or alumina-lanthana, wherein more preferably from 90 to 99 weight-%, more preferably from 92 to 97 weight-%, more preferably from 93 to 96 weight-%, of the alumina-silica or of the alumina-lanthana consist of alumina, calculated as $Al_2O_3$, based on the weight of the alumina-silica or on the weight of the alumina-lanthana, respectively.

A further preferred embodiment (109) concretizing embodiment (108) relates to said process, wherein from 1 to 10 weight-%, more preferably from 3 to 8 weight-%, more preferably from 4 to 7 weight-%, of the alumina-silica consist of silica, based on the weight of the alumina-silica, or wherein from 1 to 10 weight-%, more preferably from 3 to 8 weight-%, more preferably from 4 to 7 weight-%, of the alumina-lanthana consist of lanthana, calculated as $La_2O_3$, based on the weight of the alumina-lanthana.

A further preferred embodiment (110) concretizing embodiment (108) or (109) relates to said process, wherein the first oxidic support material exhibits a BET specific surface area of higher than 140 $m^2/g$, wherein the BET specific surface area is preferably determined according to Reference Example 1, wherein the first oxidic support material more preferably exhibits a total pore volume of higher than 0.5 ml/g, wherein the total pore volume is more preferably determined according to Reference Example 2.

A further preferred embodiment (111) concretizing any one of embodiments (88) to (110) relates to said process, wherein the second platinum group metal component supported on a second oxidic support material comprised in the first slurry provided in (a) is prepared by impregnating the second oxidic support material with a source of the second platinum group metal component.

A further preferred embodiment (112) concretizing embodiment (111) relates to said process, wherein the source of the second platinum group metal component is selected from the group consisting of organic and inorganic salts of the second platinum group metal component, wherein the source of the second platinum group metal component more preferably comprises a nitrate of the second platinum group metal component.

A further preferred embodiment (113) concretizing any one of embodiments (88) to (112) relates to said process, wherein the second platinum group metal component comprises, more preferably consists of, one or more of Ru, Os, Rh, Ir, Pd, and Pt, more preferably one or more of Rh and Pd, wherein the second platinum group metal component more preferably comprises, more preferably consists of, Rh.

A further preferred embodiment (114) concretizing any one of embodiments (88) to (113) relates to said process, wherein the second oxidic support material comprises Al, more preferably Al and one or more of Si, Zr, Ti, and La, more preferably Al, Zr, and La, wherein the second oxidic support material preferably comprises, more preferably consists of, one or more of alumina, zirconia, lanthana, alumina-zirconia, alumina-lanthana, zirconia-lanthana, and alumina-zirconia-lanthana, more preferably alumina-zirconia-lanthana, wherein preferably from 68 to 84 weight %, more preferably from 71 to 81 weight-%, more preferably from 74 to 78 weight-%, of the alumina-zirconia-lanthana consist of alumina, calculated as $Al_2O_3$, based on the weight of the alumina-zirconia-lanthana.

A further preferred embodiment (115) concretizing embodiment (114) relates to said process, wherein from 15 to 25 weight-%, more preferably from 17 to 23 weight-%, more preferably from 19 to 21 weight-%, of the alumina-zirconia-lanthana consist of zirconia, wherein preferably from 1 to 7 weight-%, more preferably from 2 to 6 weight-%, more preferably from 3 to 5 weight-%, of the alumina-zirconia-lanthana consist of lanthana, calculated as $La_2O_3$, based on the weight of the alumina-zirconia-lanthana.

A further preferred embodiment (116) concretizing embodiment (114) or (115) relates to said process, wherein the second oxidic support material exhibits a BET specific surface area of higher than 130 $m^2/g$, wherein the BET specific surface area is more preferably determined according to Reference Example 1, wherein the second oxidic support material more preferably exhibits a total pore volume of higher than 0.6 ml/g, wherein the total pore volume is more preferably determined according to Reference Example 2.

A further preferred embodiment (117) concretizing any one of embodiments (88) to (116) relates to said process, wherein the fifth platinum group metal component supported on a zeolitic material is comprised in the first slurry, wherein the fifth platinum group metal component comprises, more preferably consists of, one more of Ru, Os, Rh, Ir, Pd, and Pt, more preferably one or more of Rh and Pd, wherein the fifth platinum group metal component more preferably comprises, more preferably consists of, Pd.

A further preferred embodiment (118) concretizing embodiment (117) relates to said process, wherein the zeolitic material comprises the fifth platinum group metal component in an amount in the range of from 1.0 to 2.5 weight-%, more preferably in the range of from 1.4 to 2.0 weight %, more preferably in the range of from 1.6 to 1.8 weight-%, based on the weight of the zeolitic material.

A further preferred embodiment (119) concretizing embodiment (117) or (118) relates to said process, wherein the framework structure of the zeolitic material comprises a tetravalent element Y, a trivalent element X and oxygen, wherein the tetravalent element Y is more preferably selected from the group consisting of Si, Sn, Ti, Zr, Ge, and a mixture of two or more thereof, more preferably from the group consisting of Si, Ti, and a mixture of two or more thereof, wherein more preferably the tetravalent element Y is Si and/or Ti, wherein the trivalent element X is more preferably selected from the group consisting of B, Al, Ga, In, and a mixture of two or more thereof, more preferably from the group consisting of B, Al, and a mixture of two or more thereof, wherein more preferably the trivalent element X is B and/or Al, wherein the zeolitic material comprises, more preferably consists of, a 10 or more-membered ring pore zeolitic material, wherein the zeolitic material more preferably comprises, more preferably consists of, one or more of a 10-membered ring pore zeolitic material and a 12-membered ring pore zeolitic material, wherein the zeolitic material more preferably exhibits a molar ratio of Y to X, calculated as $YO_2:X_2O_3$, in the range of from 5:1 to 50:1, more preferably in the range of from 15:1 to 30:1, more preferably in the range of from 19:1 to 23:1, wherein more preferably from 95 to 100 weight-%, more preferably from 97 to 100 weight-%, more preferably from 99 to 100 weight-%, of the zeolitic material consists of Y, X, 0, and H, based on the weight of the zeolitic material, wherein the zeolitic material more preferably has a framework type selected from the group consisting of AEL, AFO, BEA, CHA, FAU, FER, HEU, GIS, GME, LEV, LTA, MOR, MTT, MEL, MFS, MFI, MWW, OFF, RRO, SZR, TON, USY, a mixture of two or more thereof and a mixed type of two or more thereof, more preferably selected from the group consisting of BEA, FAU, FER, GIS, LTA, MEL, MWW, MFS, MFI, MOR, MTT, TON, a mixture of two or more thereof and a mixed type of two or more thereof, more preferably selected from the group consisting of BEA, FAU, FER, GIS, and MFI, wherein more preferably the zeolitic material has a FER framework type.

A further preferred embodiment (120) concretizing any one of embodiments (88) to (119) relates to said process, wherein the source of BaO is comprised in the first slurry provided in (a), wherein the source of BaO more preferably comprises, more preferably consists of, a salt or an oxide of Ba, preferably barium nitrate.

A further preferred embodiment (121) concretizing any one of embodiments (88) to (120) relates to said process, wherein the source of $ZrO_2$ is comprised in the first slurry provided in (a), wherein the source of $ZrO_2$ more preferably comprises, more preferably consists of, an organic or an inorganic salt of Zr, more preferably zirconium acetate.

A further preferred embodiment (122) concretizing any one of embodiments (88) to (121) relates to said process, wherein the second slurry is at least partially disposed on the internal walls of the substrate or at least partially disposed on the first coating from the outlet end toward the inlet end of the substrate over 50 to 100%, more preferably 55 to 100%, more preferably 60 to 100%, more preferably 65 to 100%, of the substrate axial length.

A further preferred embodiment (123) concretizing embodiment (122) relates to said process, wherein the second slurry is at least partially disposed on the internal walls of the substrate or at least partially disposed on the first coating from the outlet end toward the inlet end of the substrate over 95 to 100%, more preferably over 98 to 100%, more preferably over 99 to 100%, of the substrate axial length.

A further preferred embodiment (124) concretizing embodiment (122) relates to said process, wherein the second slurry is at least partially disposed on the internal walls of the substrate or at least partially disposed on the first coating from the outlet end toward the inlet end of the substrate over 65 to 90%, more preferably over 65 to 80%, more preferably over 65 to 75%, of the substrate axial length.

A further preferred embodiment (125) concretizing any one of embodiments (88) to (124) relates to said process, wherein the third platinum group metal component and the fourth platinum group metal component supported on a third oxidic support material comprised in the second slurry provided in (e) is prepared by impregnating the third oxidic support material with a source of the third platinum group metal component and a source of the fourth platinum group metal component.

A further preferred embodiment (126) concretizing embodiment (125) relates to said process, wherein the source of the third platinum group metal component is selected from the group consisting of organic and inorganic salts of the third platinum group metal component, wherein the source of the third platinum group metal component more preferably comprises a nitrate of the third platinum group metal component.

A further preferred embodiment (127) concretizing embodiment (125) or (126) relates to said process, wherein the source of the fourth platinum group metal component is selected from the group consisting of organic and inorganic salts of the fourth platinum group metal component, wherein the fourth platinum group metal component more preferably comprises, more preferably consists of, Pt, and wherein the source of the fourth platinum group metal component more preferably comprises, more preferably consists of, one or more of an ammine stabilized hydroxo Pt(II) complex, hexachloroplatinic acid, potassium hexachloroplatinate, and ammonium hexachloroplatinate, more preferably one or more of tetraammineplatinum chloride, and tetraammineplatinum nitrate, wherein the source of the fourth platinum group metal component preferably comprises, more preferably consists of, tetraammineplatinum chloride.

A further preferred embodiment (128) concretizing any one of embodiments (88) to (127) relates to said process, wherein the third platinum group metal component comprises, more preferably consists of, one more of Ru, Os, Rh, Ir, Pd, and Pt, wherein the third platinum group metal component more preferably comprises, more preferably consists of, Pd.

A further preferred embodiment (129) concretizing any one of embodiments (88) to (128) relates to said process, wherein the fourth platinum group metal component comprises, more preferably consists of, one more of Ru, Os, Rh, Ir, Pd, and Pt, wherein the fourth platinum group metal component more preferably comprises, more preferably consists of, Pt.

A further preferred embodiment (130) concretizing any one of embodiments (88) to (129) relates to said process, wherein the third oxidic support material comprises Al, more preferably Al and one or more of Si, Zr, Ti, and La, more preferably Al and Si, wherein the third oxidic support material preferably comprises, more preferably consists of, one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana, preferably one or more of alumina, silica, lanthana, alumina-silica, alumina-lanthana, and silica-lanthana, more preferably alumina-silica, wherein more preferably from 90 to 99 weight-%, more preferably from 92 to 97 weight-%, more preferably from 94 to 96 weight-%, of the alumina-silica or of the alumina-lanthana consist of alumina, calculated as $Al_2O_3$, based on the weight of the alumina-silica or on the weight of the alumina-lanthana, respectively, and wherein more preferably from 1 to 10 weight-%, more preferably from 3 to 8 weight-%, more preferably from 4 to 6 weight-%, of the alumina-silica consist of silica, calculated as $SiO_2$, based on the weight of the alumina-silica.

A further preferred embodiment (131) concretizing any one of embodiments (88) to (130) relates to said process, wherein the third oxidic support material exhibits a BET specific surface area of higher than 150 $m^2/g$, wherein the BET specific surface area is more preferably determined according to Reference Example 1, wherein the third oxidic support material more preferably exhibits a total pore volume of higher than 0.5 ml/g, wherein the total pore volume is more preferably determined according to Reference Example 2.

A further preferred embodiment (132) concretizing any one of embodiments (88) to (131) relates to said process, wherein the process comprises drying according to (c), wherein drying is performed in a gas atmosphere having a temperature in the range of from 80 to 140° C., more preferably in the range of from 100 to 120° C., more preferably for a duration in the range of from 0.25 to 3 hours, more preferably in the range of from 0.5 to 1.5 hours, wherein the gas atmosphere more preferably comprises, more preferably consists of one or more of oxygen, nitrogen, air and lean air.

A further preferred embodiment (133) concretizing any one of embodiments (88) to (132) relates to said process, wherein calcining in (d) is performed in a gas atmosphere having a temperature in the range of from 500 to 650° C., more preferably in the range of from 580 to 600° C., more preferably for a duration in the range of from 0.5 to 5 hours, more preferably in the range of from 1.5 to 2.5 hours, wherein the gas atmosphere more preferably comprises, more preferably consists of one or more of oxygen, nitrogen, air and lean air.

A further preferred embodiment (134) concretizing any one of embodiments (88) to (133) relates to said process, wherein the process comprises drying according to (g), wherein drying is performed in a gas atmosphere having a temperature in the range of from 80 to 140° C., more preferably in the range of from 100 to 120° C., more preferably for a duration in the range of from 0.25 to 3 hours, more preferably in the range of from 0.5 to 1.5 hours, wherein the gas atmosphere more preferably comprises, more preferably consists of one or more of oxygen, nitrogen, air and lean air.

A further preferred embodiment (135) concretizing any one of embodiments (88) to (134) relates to said process, wherein calcining in (h) is performed in a gas atmosphere having a temperature in the range of from 500 to 650° C., more preferably in the range of from 580 to 600° C., more preferably for a duration in the range of from 0.5 to 5 hours, more preferably in the range of from 1.5 to 2.5 hours, wherein the gas atmosphere more preferably comprises, more preferably consists of one or more of oxygen, nitrogen, air and lean air.

An embodiment (136) of the present invention relates to a catalyst for the treatment of a diesel exhaust gas obtainable or obtained by a process according to any one of embodiments (88) to (135).

An embodiment (137) of the present invention relates to a method for the treatment of an exhaust gas of a diesel combustion engine, comprising providing an exhaust gas from a diesel combustion engine and passing said exhaust gas through a catalyst according to any one of embodiments (1) to (87) and (136).

An embodiment (138) of the present invention relates to a use of a catalyst according to any one of embodiments (1) to (87) and (136) for the treatment of an exhaust gas of a diesel combustion engine, said use comprising passing said exhaust gas through said catalyst.

The unit bar(abs) refers to an absolute pressure of 105 Pa and the unit Angstrom refers to a length of $10^{-10}$ m.

In the context of the present invention, the term "the surface of the internal walls" is to be understood as the "naked" or "bare" or "blank" surface of the walls, i. e. the surface of the walls in an untreated state which consists—apart from any unavoidable impurities with which the surface may be contaminated—of the material of the walls.

In the context of the present invention, the term "consists of" with regard to the weight-% of one or more components indicates the weight-% amount of said component(s) based on 100 weight-% of the designated entity. For example, the wording "wherein from 0 to 0.001 weight-% of the first coating consists of X" indicates that among the 100 weight-% of the components of which said coating consists of, 0 to 0.001 weight-% is X.

In the context of the present invention, it is preferred that a platinum group metal component comprises, more preferably consists of, respective one or more platinum group metals or one or more oxides of respective one or more platinum group metals.

In the context of the present invention, the expression "wherein the first platinum group metal component is different to the second platinum group metal component" means that the first platinum group metal component differs from the latter in at least one physical and/or chemical characteristic/property, e.g. the two components differ in their respective platinum group metal. Thus, in the context of the present invention, if the first platinum group metal component is palladium, the second platinum group metal is not palladium but another platinum group metal such as rhodium. Similarly, two oxygen storage materials can differ from each other. Also, two coatings, e.g. a first and a second coating, can differ from each other, in particular with respect to their chemical composition and/or their physical properties.

In the context of the present invention, a weight/loading of a platinum group metal component is calculated as the weight/loading of the respective platinum group metal as element or the sum the weights/loadings of the respective platinum group metals as elements. For example, if a platinum group metal component is Rh, the weight of said platinum group metal component is calculated as elemental Rh. As a further example, if a platinum group metal component consists of Pt and Pd, the weight of said platinum group metal component is calculated as elemental Pt and Pd.

In the context of the present invention, it is preferred that the first oxidic support material is different—preferably chemically and physically different—to the first oxygen storage compound. It is preferred that the first oxidic support material is different—in particular chemically and physically different—to the second oxygen storage compound.

Further in the context of the present invention, it is preferred that the second oxidic support material is different—preferably chemically and physically different—to the first oxygen storage compound. It is preferred that the second oxidic support material is different—preferably chemically and physically different—to the second oxygen storage compound.

Further in the context of the present invention, it is preferred that the third oxidic support material is different— preferably chemically and physically different—to the first oxygen storage compound. It is preferred that the third oxidic support material is different—preferably chemically and physically different—to the second oxygen storage compound.

Further in the context of the present invention, it is preferred that the first oxidic support material is chemically and physically identical, or different, to the second oxidic support material.

Further in the context of the present invention, it is preferred that the first oxidic support material is chemically and physically identical, or different, to the third oxidic support material. It is more preferred that the first oxidic support material is chemically and physically identical to the third oxidic support material.

Further in the context of the present invention, it is preferred that the second oxidic support material is chemically and physically identical, or different, to the third oxidic support material. in the context of the present invention, the terms "oxygen storage compound", "oxygen storage component" and "oxygen storage material" are used interchangeably.

The present invention is further illustrated by the following examples and reference examples.

EXAMPLES

Reference Example 1: Determination of the BET Specific Surface Area

The BET specific surface area is determined according to ISO 9277:2010.

Reference Example 2: Determination of the Total Pore Volume

The total pore volume was determined according to ISO 15901-2:2006.

Reference Example 3: Determination of the Crystallinity

The determination of the relative crystallinity of a zeolite was performed via x-ray diffraction using a test method under the jurisdiction of ASTM Committee D32 on catalysts, in particular of Subcommittee D32.05 on zeolites. The current edition was approved on Mar. 10, 2001 and published in May 2001, which was originally published as D 5758-95.

Reference Example 4: Oxygen Storage Components

Three different oxygen storage components (OSC 1, OSC 2, OSC 3) were employed, having the chemical compositions as listed in Table 1 below.

TABLE 1

Chemical compositions of oxygen storage components employed

| # | $ZrO_2$ [weight-%] | $CeO_2$ [weight-%] | $La_2O_3$ [weight-%] | $Pr_6O_{11}$ [weight-%] | $Nd_2O_3$ [weight-%] | $Al_2O_3$ [weight-%] |
|---|---|---|---|---|---|---|
| OSC 1 | 45 | 45 | 8 | 2 | — | — |
| OSC 2 | 57 | 28 | 1 | 7 | 7 | — |
| OSC 3 | — | 50 | — | — | — | 50 |

Reference Example 5: Preparation of a Pd Impregnated Ferrierite Zeolite

A zeolitic material in its ammonium form and having framework type FER (molar ratio $SiO_2:Al_2O_3=21$; crystallinity determined by XRD >90%, wherein the crystallinity is determined as described in Reference Example 3) was wet-impregnated with an aqueous solution of palladium nitrate, dried in air having a temperature of 110° C. for 1 hour and calcined in air at 590° C. for 2 hours to attain a Pd loading of 1.7 weight-% based on the weight of the zeolitic material. The resulting powder of zeolitic material comprising Pd (Pd-FER) was slurried in water for further use.

Comparative Example 1: Preparation of a Layered Diesel Oxidation Catalyst (DOC) without Oxygen Storage Component An alumina-silica support material (having a BET specific surface area of higher than 150 $m^2/g$ and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content in the range of from 10 to 20 weight-%) and palladium (using an aqueous solution containing Pd nitrate and having a concentration in the range of from 15 to 23 weight-%), calculated as elements, respectively, in a weight ratio of 2:1 via a wet impregnation process. A slurry containing the resulting material and a zeolite having framework type BEA (having a silica-to-alumina molar ratio, $SiO_2:Al_2O_3$, of 23:1 and a crystallinity determined by XRD >90%, wherein the crystallinity is determined as described in Reference Example 3) was coated on a cordierite flow-through substrate (having about 400 CPSI (cells per square inch) and a wall thickness of about 40 micrometers) from the inlet end over the axial length of said substrate, wherein the cordierite flow-through substrate had a total volume of 1.4 l. Then, the coated substrate was dried in air at 110° C. for 1 h and calcined in air at 590° C. for 2 h. The first coating (bottom coating) contained 40 $g/ft^3$ platinum and 20 $g/ft^3$ palladium. The loading of the first coating was 1.87 $g/in^3$.

An alumina-silica support material (having a BET specific surface area of higher than 150 $m^2/g$ and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 6:1, calculated as elements, respectively, via a wet impregnation process. A slurry containing the resulting material was coated from the outlet end of the cordierite flow-through substrate coated with the bottom coat over a length of 50% of the axial length of the substrate. Then, the coated substrate was dried in air at 110° C. for 1 h and calcined in air at 590° C. for 2 h. The resulting second coating (top coating) contained 51.5 g/ft$^3$ platinum and 8.5 g/ft$^3$ palladium. The loading of the second coating was 1.4 g/in$^3$.

Example 1: Preparation of a Layered Three-Way Diesel Catalyst (TDC)

An alumina-silica support material (having a BET specific surface area of higher than 150 m$^2$/g and a pore volume of higher than 0.5 ml/g, and comprising 5 weight-% $SiO_2$) was impregnated with palladium via incipient wetness method. The resulting impregnated support material was dispersed in water and acetic acid. Into the resulting slurry was dispersed a mixture of OSC 1 and OSC 2.

An alumina-zirconia-lanthana support material (having a BET specific surface area of higher than 130 m$^2$/g and a pore volume of higher than 0.6 ml/g, and comprising 20 weight-% $ZrO_2$ and 3 weight-% $La_2O_3$) was impregnated with rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

The resulting final slurry was coated on a cordierite flow-through substrate (having about 400 CPSI (cells per square inch) and a wall thickness of about 40 micrometers) from the inlet end over the axial length of said substrate, wherein the cordierite flow-through substrate had a total volume of 1.4 l. Then, the coated substrate was dried in air at 110° C. for 1 h and calcined in air at 590° C. for 2 h. The first coating (bottom coating) contained 33.8 g/ft$^3$ palladium and 5 g/ft$^3$ rhodium. The loading of the first coating was 2 g/in$^3$ comprising 0.4 g/in$^3$ OSC 1 and 0.2 g/in$^3$ OSC 2.

An alumina-silica support material (having a BET specific surface area of higher than 150 m$^2$/g and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing the resulting material was coated on the cordierite flow-through substrate from the outlet end over the axial length of the cordierite substrate coated with the first coating. Then, the coated substrate was dried in air at 110° C. for 1 h and calcined in air at 590° C. for 2 h. The second coating (top coating) contained 95 g/ft$^3$ platinum and 11.2 g/ft$^3$ palladium.

The loading of the second coating was 1.5 g/in$^3$.

Example 2: Preparation of a Layered Three-Way Diesel Catalyst (TDC)

An alumina-silica support material (having a BET specific surface area of higher than 150 m$^2$/g and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry a mixture of OSC 1 and OSC 2 was dispersed.

An alumina-zirconia-lanthana support material (having a BET specific surface area of higher than 130 m$^2$/g and a pore volume of higher than 0.6 ml/g, and comprising 20 weight-% $ZrO_2$ and 3 weight-% $La_2O_3$) was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

The final slurry was coated from the inlet of a cordierite flow-through substrate (having about 400 CPSI (cells per square inch) and a wall thickness of about 40 micrometers) over the axial length of the substrate, wherein said substrate had a total volume of 0.39 l. Then, the coated substrate was dried in air at 110° C. for 1 h and calcined in air at 590° C. for 2 h. The first coating (bottom coating) contained 36.2 g/ft$^3$ palladium and 5 g/ft$^3$ rhodium. The loading of the first coating was 2 g/in$^3$ comprising 0.4 g/in$^3$ OSC 1, 0.2 g/in$^3$ OSC 2 and 0.4 g/in$^3$ alumina-zirconia-lanthana.

An alumina-silica support material (having a BET specific surface area of higher than 150 m$^2$/g and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the cordierite flow-through substrate over the axial length of the substrate coated with the first coating. Then, the coated substrate was dried in air at 110° C. for 1 h and calcined in air at 590° C. for 2 h. The second coating (top coating) contained 96.8 g/ft$^3$ platinum and 12 g/ft$^3$ palladium. The loading of the second coating was 1.5 g/in$^3$.

Comparative Example 2: Preparation of a Single Coat Three-Way Diesel Catalyst

An alumina-silica support material (having a BET specific surface area of higher than 150 m$^2$/g and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry a mixture of OSC 1 and OSC 2 was dispersed.

An alumina-zirconia-lanthana support material (having a BET specific surface area of higher than 130 m$^2$/g and a pore volume of higher than 0.6 ml/g) comprising 20 weight-% $ZrO_2$ and 3 weight-% $La_2O_3$ was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

An alumina-silica support material (having a BET specific surface area of higher than 150 m$^2$/g and a pore volume of higher than 0.5 ml/g) comprising 5 weight-% $SiO_2$ was impregnated with platinum (using an aqueous solution containing an ammine stabilized hydroxo Pt(IV) complex, said solution having a Pt content between 10 and 20 weight-%)

and palladium (using an aqueous solution containing Pd nitrate and having a concentration in the range of from 15 to 23 weight-%) in a weight ratio of 6.7:1, calculated as elements, respectively, via a wet impregnation process. The resulting Pt and Pd on alumina-silica containing slurry was added to the OSC and Pd on alumina containing slurry and the Rh on alumina-zirconia-lanthana containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 0.39 l. Then, the coated substrate was dried in air at 110° C. for 1 h and calcined in air at 590° C. for 2 h. The single coating contained 96.8 g/ft$^3$ platinum, 48.2 g/ft$^3$ palladium and 5 g/ft$^3$ rhodium.

The loading of the single coating was 3.1 g/in$^3$ comprising 0.4 g/in$^3$ OSC 1, 0.2 g/in$^3$ OSC 2, 0.4 g/in$^3$ alumina-zirconia-lanthana.

Comparative Example 3: Preparation of a Layered Three-Way Diesel Catalyst (TDC)

An alumina-silica support material (having a BET specific surface area of higher than 150 m$^2$/g and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry, OSC 2 was dispersed.

An alumina-zirconia-lanthana support material (having a BET specific surface area of higher than 130 m$^2$/g and a pore volume of higher than 0.6 ml/g, and comprising 20 weight-% $ZrO_2$ and 3 weight-% $La_2O_3$) was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 2 and Pd on alumina-silica containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 0.39 l. Then, the coated substrate dried in air at 110° C. for 1 h and calcined in air at 590° C. for 2 h. The first coating (bottom coating) contained 36.2 g/ft$^3$ palladium and 5 g/ft$^3$ rhodium. The loading of the first coating was 2 g/in$^3$ comprising 0.6 g/in$^3$ of OSC 2 and 0.4 g/in$^3$ of alumina-zirconia-lanthana.

An alumina-silica support material (having a BET specific surface area of higher than 150 m$^2$/g and a pore volume of higher than 0.5 ml/g) comprising 5 weight-% $SiO_2$ was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the cordierite substrate over the axial length of the substrate coated with the first coating. Then, the coated substrate was dried in air at 110° C. for 1 h and calcined in air at 590° C. for 2 h. The second coating (top coating) contained 96.8 g/ft$^3$ platinum and 12 g/ft$^3$ palladium. The loading of the second coating was 1.5 g/in$^3$.

Example 3: Preparation of a Layered Three-Way Diesel Catalyst (TDC)

An alumina-silica support material (having a BET specific surface area of higher than 150 m$^2$/g and a pore volume of higher than 0.5 ml/g) comprising 5 weight-% $SiO_2$ was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry OSC 3 was dispersed.

An alumina-zirconia-lanthana support material (having a BET specific surface area of higher than 130 m$^2$/g and a pore volume of higher than 0.6 ml/g) comprising 20 weight-% $ZrO_2$ and 3 weight-% $La_2O_3$ was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 3 and Pd on alumina-silica containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 0.39 l. Then, the coated substrate was dried in air at 110° C. for 1 h and calcined in air at 590° C. for 2 h. The first coating (bottom coating) contained 36.2 g/ft$^3$ palladium and 5 g/ft$^3$ rhodium. The loading of the first coating was 2 g/in$^3$ comprising 0.6 g/in$^3$ OSC 3 and 0.4 g/in$^3$ alumina-zirconia-lanthana.

An alumina-silica support material (having a BET specific surface area of higher than 150 m$^2$/g and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the already coated cordierite substrate over the axial length of the substrate coated with the first coating. Then, the coated substrate was dried in air at 110° C. for 1 h and calcined in air at 590° C. for 2 h. The second coating (top coating) contained 96.8 g/ft$^3$ platinum and 12 g/ft$^3$ palladium. The loading of the second coating was 1.5 g/in$^3$.

Example 4: Preparation of a Layered Three-Way Diesel Catalyst (TDC)

An alumina-silica support material (having a BET specific surface area of higher than 150 m$^2$/g and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry a mixture of OSC 1 and OSC 2 was dispersed.

An alumina-zirconia-lanthana support material (having a BET specific surface area of higher than 130 m$^2$/g and a pore volume of higher than 0.6 ml/g) comprising 20 weight-% $ZrO_2$ and 3 weight-% $La_2O_3$ was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

The final slurry was coated from the inlet of a cordierite flow-through substrate (having about 400 CPSI (cells per square inch) and a wall thickness of about 40 micrometers) over 70% of the axial length of the substrate, wherein the cordierite flow-through substrate had a total volume of 0.39 l. Then, the coated substrate was dried in air at 110° C. for 1 h and calcined in air at 590° C. for 2 h. The first coating (inlet bottom coating) contained 72.2 g/ft$^3$ palladium and 7.1 g/ft$^3$ rhodium. The loading of the first coating was 1.6 g/in$^3$ comprising 0.4 g/in$^3$ OSC 1, 0.2 g/in$^3$ OSC 2 and 0.4 g/in$^3$ alumina-zirconia-lanthana, alumina-silica 0.6.

An alumina-silica support material (having a BET specific surface area of higher than 150 m$^2$/g and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the cordierite substrate over 70% of the axial length of the substrate partially coated with the first coating. Then, the coated substrate was dried in air at 110° C. for 1 h and calcined in air at 590° C. for 2 h. The second coating (outlet top coating) contained 120 g/ft$^3$ platinum and 15 g/ft$^3$ palladium. The loading of the second coating was 1.85 g/in$^3$.

The loadings of the coatings as mentioned above are based on the substrate volume considering the respective coating length being 70% of the axial length of the substrate. Based on the total substrate volume the loadings would be as follows. The total loading of Pt would be 84 g/ft$^3$, the total loading of Pd would be 61.5 g/ft$^3$, the total loading of Rh would be 5 g/ft$^3$. Accordingly, the loading of the first coating would have been 2.3 g/in$^3$ comprising 0.57 g/in$^3$ OSC 1, 0.29 g/in$^3$ OSC 2 and 0.57 g/in$^3$ alumina-zirconia-lanthana, alumina-silica 0.86 g/in$^3$. Further, the loading of the second coating would have been 2.6 g/in$^3$.

Example 5: Preparation of a Layered Three-Way Diesel Catalyst (TDC)

An alumina-silica support material (having a BET specific surface area of higher than 150 m$^2$/g and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnate support material was dispersed in water and acid (e.g. acetic acid). Into this slurry a mixture of OSC 1 and OSC 2 was dispersed.

An alumina-zirconia-lanthana support material (having a BET specific surface area of higher than 130 m$^2$/g and a pore volume of higher than 0.6 ml/g, and comprising 20 weight-% $ZrO_2$ and 3 weight-% $La_2O_3$) was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 2 l. Then, the coated substrate was dried in air at 110° C. for 1 h and calcined in air at 590° C. for 2 h. The first coating (bottom coating) contained 36.2 g/ft$^3$ palladium and 5 g/ft$^3$ rhodium. The loading of the first coating was 2 g/in$^3$ comprising 0.4 g/in$^3$ OSC 1, 0.2 g/in$^3$ OSC 2 and 0.4 g/in$^3$ alumina-zirconia-lanthana support.

An alumina-silica support material (having a BET specific surface area of higher than 150 m$^2$/g and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the already coated cordierite substrate over the axial length of the substrate. Then, the coated substrate was dried in air at 110° C. for 1 h and calcined in air at 590° C. for 2 h. The second coating (top coating) contained 96.8 g/ft$^3$ platinum and 12 g/ft$^3$ palladium. The loading of the second coating was 1.5 g/in$^3$.

Example 6: Preparation of a Layered Three-Way Diesel Catalyst (TDC)

An alumina-lanthana support material (having a BET specific surface area of 150 m$^2$/g and a pore volume of 0.54 ml/g, and comprising 4 weight-% $La_2O_3$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry a mixture of OSC 1, OSC 2, and $Ba(NO_3)_2$ was dispersed.

An alumina-zirconia-lanthana support material (having a BET specific surface area of higher than 130 m$^2$/g and a pore volume of higher than 0.6 ml/g, and comprising 20 weight-% $ZrO_2$ and 3 weight-% $La_2O_3$) was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-lanthana containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 2 l. Then, the coated substrate was dried in air at 110° C. for 1 h and calcined in air at 590° C. for 2 h. The first coating (bottom coating) contained 36.25 g/ft$^3$ palladium and 5 g/ft$^3$ rhodium. The loading of the first coating was 1.97 g/in$^3$ comprising 0.5 g/in$^3$ OSC 1, 0.25 g/in$^3$ OSC 2, 0.07 g/in$^3$ BaO, 0.75 g/in$^3$ alumina-lanthana, and 0.4 g/in$^3$ alumina-zirconia-lanthana.

An alumina-silica support material (having a BET specific surface area of higher than 150 $m^2/g$ and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 2:1, calculated as elements, respectively, via a wet impregnation process. A slurry containing this material was coated from the outlet of the already coated cordierite substrate over the axial length of the substrate. Then, the coated substrate was dried in air at 110° C. for 1 h and calcined in air at 590° C. for 2 h. The second coating (top coating) contained 72.5 g/$ft^3$ platinum and 36.25 g/$ft^3$ palladium. The loading of the second coating was 1.5 g/$in^3$.

Example 7: Preparation of a Layered Three-Way Diesel Catalyst (TDC)

An alumina-silica support material (having a BET specific surface area of higher than 150 $m^2/g$ and a pore volume of higher than 0.5 ml/g, and comprising 5 weight-% $SiO_2$) was impregnated with palladium (using an aqueous solution containing Pd nitrate and having a concentration in the range of from 15 to 23 weight-%) via incipient wetness method. The resulting impregnated support material was dispersed in water and acid (e.g. acetic acid). Into this slurry a mixture of OSC 1 and OSC 2 was dispersed.

An alumina-zirconia-lanthana support material (having a BET specific surface area of higher than 130 $m^2/g$ and a pore volume of higher than 0.6 ml/g) comprising 20 weight-% $ZrO_2$ and 3 weight-% $La_2O_3$ was impregnated with Rhodium (using an aqueous solution containing Rh nitrate and having a concentration in the range of from 6 to 12 weight-%) via incipient wetness method. The resulting Rh on alumina-zirconia-lanthana containing slurry was added to the OSC 1, OSC 2, and Pd on alumina-silica containing slurry.

A zeolitic material in its ammonium form and having framework type FER was wet impregnated with palladium (using an aqueous solution containing Pd nitrate and having a concentration in the range of from 15 to 23 weight-%) to attain a Pd loading of 1.74 weight-%. The resulting zeolitic material supporting Pd containing slurry was mixed with zirconium acetate ($ZrAc_4$) and added to the OSC 1, OSC 2, and Rh on alumina-zirconia-lanthana/Pd on alumina-silica containing slurry.

The final slurry was coated from the inlet of a cordierite flow-through substrate (having about 400 CPSI (cells per square inch) and a wall thickness of about 40 micrometers) over the axial length of the substrate, wherein the cordierite flow-through substrate had a total volume of 2 l. Then, the coated substrate was dried in air at 110° C. for 1 h and calcined in air at 590° C. for 2 h. The first coating (bottom coating) contained 80 g/$ft^3$ palladium and 5 g/$ft^3$ rhodium. The loading of the first coating was 3.4 g/$in^3$ comprising 0.325 g/$in^3$ OSC 1, 0.163 g/$in^3$ OSC 2, 0.325 g/$in^3$ alumina comprising Zr and La, 0.488 g/$in^3$ alumina comprising Si, 2.0 g/$in^3$ FER, and 0.1 g/$in^3$ $ZrO_2$.

An alumina-silica support material (having a BET specific surface area of higher than 150 $m^2/g$ and a pore volume of higher than 0.5 ml/g, and comprising 5 weight-% $SiO_2$) was impregnated with platinum (using an aqueous solution containing an ammine stabilized hydroxo Pt(IV) complex, said solution having a Pt content between 10 and 20 weight-%) and palladium (using an aqueous solution containing Pd nitrate and having a concentration in the range of from 15 to 23 weight-%) in a weight ratio of 8:1, calculated as elements, respectively, via a wet impregnation process. A slurry containing this material was coated from the outlet of the already coated cordierite substrate over the axial length of the substrate. Then, the substrate was dried in air at 110° C. for 1 h and calcined in air at 590° C. for 2 h. The second coating (top coating) contained 57.8 g/$ft^3$ platinum and 7.2 g/$ft^3$ palladium. The loading of the second coating was 1.0 g/$in^3$.

Example 8: Catalytic Testing—Engine Evaluation Under Lambda=1 Conditions

A catalyst according to Comparative Example 1 and a catalyst according to Example 1 were tested each under Lambda 1 conditions on a 2 l diesel engine after aging for 16 h at 800° C. in air comprising 10% steam. The engine exhaust temperature was adjusted via speed and load to achieve 180° C. at the catalyst front. After 180 s the lambda was reduced to have a stoichiometric air to fuel ratio (lambda=1) for 50 s. The conversion of CO, THC and NOx was evaluated during the lambda 1 period. FIG. 1 shows the NOx emissions at the inlet and outlet of the catalyst. Table 1 shows the conversion of NOx, CO and THC after 20 s lambda rich conditions (203 s).

TABLE 1

Conversion of NOx, CO and THC after 20 s lambda rich conditions (203 s) for Comparative Example 1 and Example 1.

| | NOx Conversion/% | CO Conversion/% | THC Conversion/% |
|---|---|---|---|
| Comparative Example 1 | 2 | 0.3 | 7 |
| Example 1 | 73 | 77 | 71 |

Comparative Example 1 without three-way catalytic function shows during lambda=1 conditions higher NOx emissions and lower conversion of NOx, CO and THC compared to the Example 1.

Example 9: Catalytic Testing—Laboratory Reactor Evaluation Under Lambda=1 Conditions The catalysts according to Examples 2, 3, and 4 and according to Comparative Examples 2 and 3 were tested in a laboratory test reactor under Lambda 1 conditions after aging for 16 h at 800° C. in 10% steam/air. The oxidative and reductive gas composition was set to achieve Lambda=1 for 200 s, the space velocity was set to 50 K, the catalyst inlet temperature 180° C. and the NOx inlet concentration to 90 ppm.

FIG. 2 shows the NOx emissions at the inlet and outlet of the tested catalysts. Table 2 shows the conversion of NOx, CO and THC after 20 s lambda rich conditions.

TABLE 2

Conversion of NOx, CO and THC after 20 s lambda rich conditions for Comparative Examples 2 and 3, and for Examples 2, 3, and 4.

| | NOx Conversion/% | CO Conversion/% | THC Conversion/% |
|---|---|---|---|
| Example 2 | 98.4 | 96.3 | 90.3 |
| Comparative Example 2 | 63.6 | 8.4 | 2.5 |
| Comparative Example 3 | 86 | 78.9 | 53.8 |
| Example 3 | 97.3 | 98.2 | 94.5 |
| Example 4 | 98.6 | 96.8 | 96.1 |

Comparative Example 2 without separation of the three-way function and DOC function shows during lambda=1 conditions the highest NOx emissions and lowest conversion of NOx, CO and THC. Comparative Example 3 comprising only OSC 2 as oxygen storage component shows the lower three-way gas conversion compared to the Example 2 having a mixture of OSC 1 and OSC 2. Examples 3 and 4 in accordance with the present invention with OSC 3 and a zoned coating configuration, respectively, show the best three-way conversions among the examples.

Example 10: Catalytic Testing—Engine Evaluation Under Lambda=1 Conditions

Examples 5 and 6 were tested each under Lambda 1 conditions on a 2 l diesel engine after aging for 16 h at 800° C. in a mixture of 10% steam in air. The engine exhaust temperature was adjusted via speed and load to achieve 180° C. at the catalyst front. After 180 s the lambda was reduced to have a stoichiometric air to fuel ratio (lambda=1) for 50 s. The NOx adsorption in the 180° C. pre lambda=1 phase as well as the conversion of CO, THC and NOx during the lambda 1 period were evaluated. FIG. 3 shows the NOx emissions at the inlet and outlet of Examples 5 and 6. Table 3 shows the amount NOx adsorbed after 180 s, the conversion of NOx, CO and THC after 30 s lambda rich conditions (213 s).

TABLE 3

Amount of NOx adsorbed after 180 s, conversion of NOx, CO and THC after 30 s lambda rich conditions (213 s) for Examples 5 and 6.

| | NOx adsorbed/ mg | NOx Conversion/ % | CO Conversion/ % | THC Conversion/ % |
|---|---|---|---|---|
| Example 5 | 76 | 93 | 85 | 84 |
| Example 6 | 187 | 51 | 90 | 85 |

Example 11: Catalytic Testing—Engine Evaluation Under Lambda=1 Conditions

Examples 5 and 7 were tested each under Lambda 1 conditions on a 2 l diesel engine. The engine exhaust temperature was adjusted via speed and load to achieve 180° C. at the catalyst front. After 180 s the lambda was reduced to have a stoichiometric air to fuel ratio (lambda=1) for 50 s. The NOx adsorption in the 180° C. pre lambda=1 phase as well as the conversion of CO, THC and NOx during the lambda 1 period were evaluated. FIG. 4 shows the NOx emissions from at the inlet and outlet of the examples 5 and 7. Table 4 shows the amount NOx adsorbed after 180 s, the conversion of NOx, CO and THC after 30 s lambda rich conditions (213 s).

TABLE 4

Amount of NOx adsorbed after 180 s, conversion of NOx, CO and THC after 30 s lambda rich conditions (213 s) for Examples 5 and 7.

| | NOx adsorbed/mg | NOx Conversion/% | CO Conversion/% | THC Conversion/% |
|---|---|---|---|---|
| Example 5 | 132 | 88 | 96 | 91 |
| Example 7 | 685 | 84 | 98 | 90 |

Example 5 and 7 show desorption of the pre-adsorbed NOx. The desorption occurs at the beginning of the lambda=1 phase and is higher when more NOx is pre-adsorbed. The amount of the pre adsorbed NOx is higher for Example 7.

Example 7 shows high NOx adsorption during the 180 s lean pre-phase and low NOx desorption at the start of the lambda=1 phase. Pd/FER material does not desorb the NOx under Lambda 1 conditions.

CITED LITERATURE

EP 0904482 B2

Figure 1:
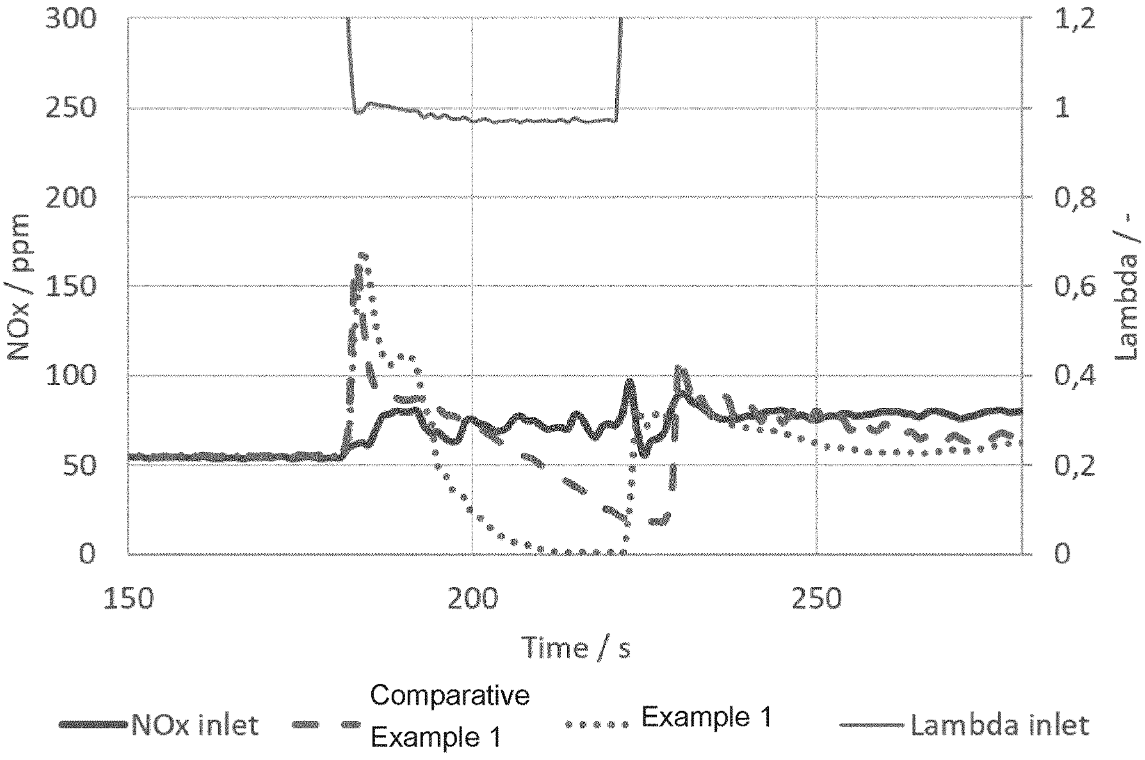
FIG. 1: shows the NOx emissions at the inlet and outlet of the catalyst. The time in s is shown on the abscissa, the NOx emissions in ppm are shown on the left ordinate and the Lambda is shown on the right ordinate.
Figure 2:
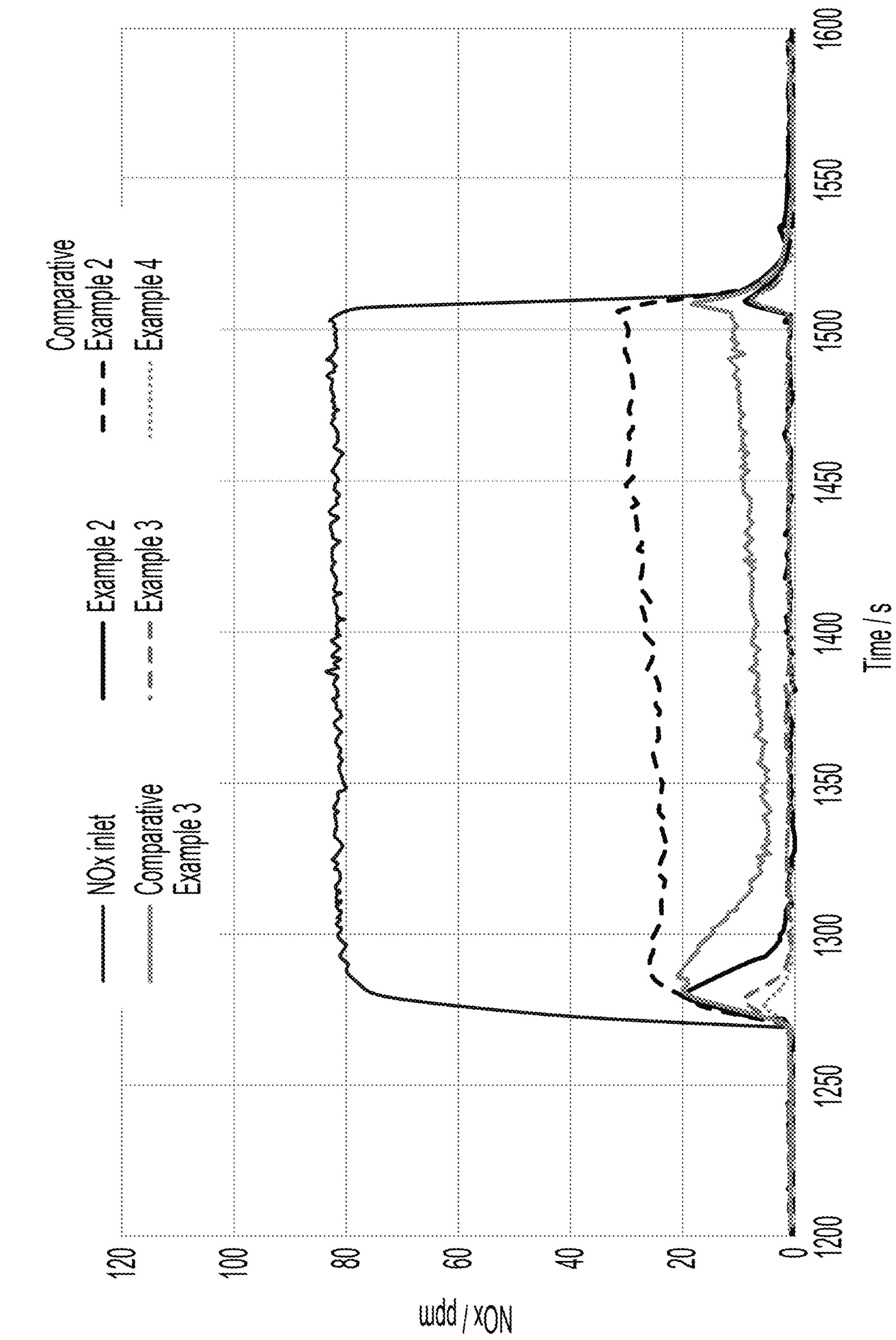
FIG. 2: shows the NOx emissions at the inlet and outlet of the tested catalysts. The time in s is shown on the abscissa and the NOx emissions in ppm are shown on the ordinate.
Figure 3:
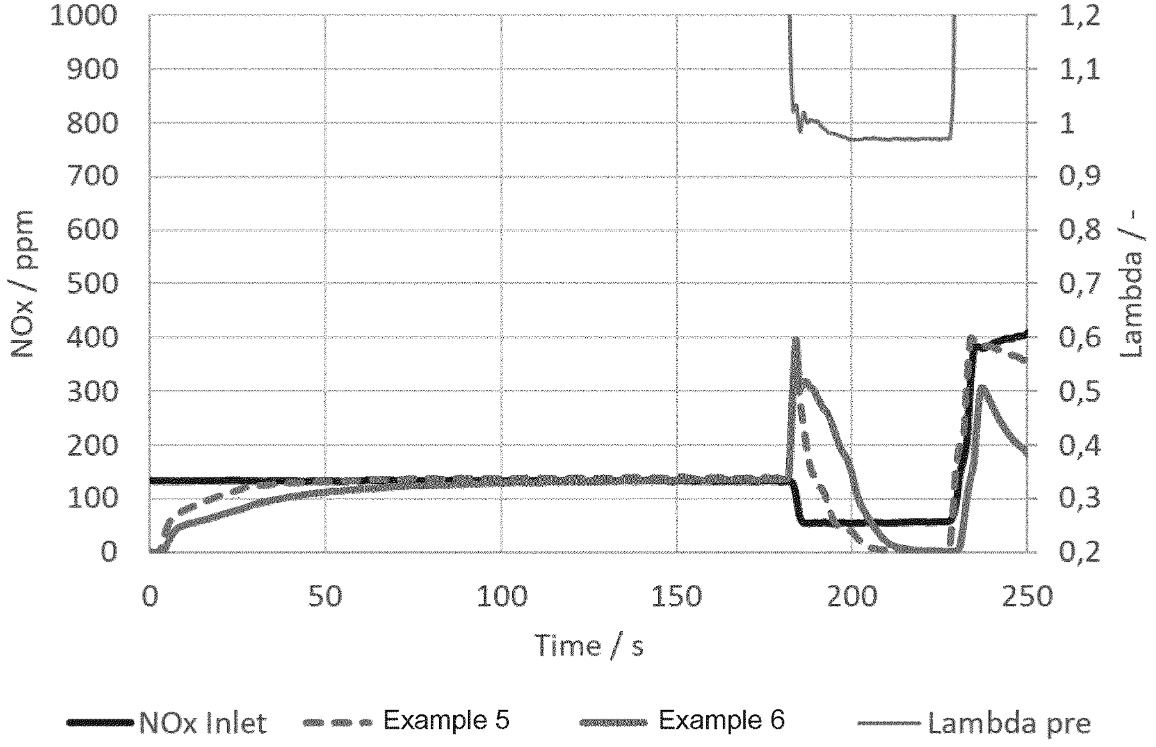
FIG. 3: shows the NOx emissions at the inlet and outlet of Examples 5 and 6. The time in s is shown on the abscissa, the NOx emissions in ppm are shown on the left ordinate and the Lambda is shown on the right ordinate.
Figure 4:
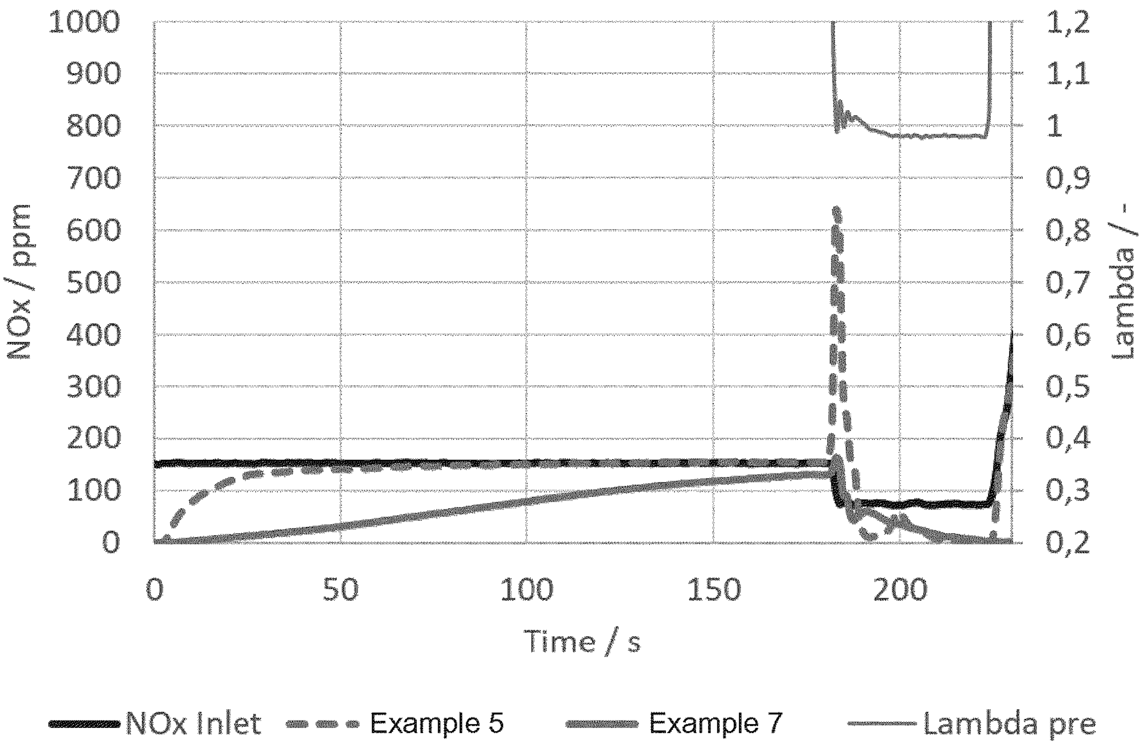
FIG. 4: shows the NOx emissions from at the inlet and outlet of the examples 5 and 7. The time in s is shown on the abscissa, the NOx emissions in ppm are shown on the left ordinate and the Lambda is shown on the right ordinate.

The invention claimed is:

1. A catalyst for the treatment of a diesel exhaust gas, the catalyst comprising (i) a substrate comprising an inlet end, an outlet end, a substrate axial length extending from the inlet end to the outlet end of the substrate and a plurality of passages defined by internal walls of the substrate extending therethrough;

(ii) a first coating disposed on the surface of the internal walls of the substrate and extending over at least 50% of the axial length of the substrate from the inlet end toward the outlet end, wherein the first coating comprises a first platinum group metal component supported on a first oxidic support material, a second platinum group metal component supported on a second oxidic support material, wherein the first platinum group metal component is different to the second platinum group metal component, and a first oxygen storage compound, wherein at least 30 weight-% of the first oxygen storage compound consist of cerium oxide, calculated as $CeO_2$, wherein the first coating is free of Pt; and (iii) a second coating extending over at least 50% of the axial length of the substrate from the outlet end toward the inlet end and disposed either on the surface of the internal walls of the substrate, or on the surface of the internal walls of the substrate and the first coating, or on the first coating, wherein the second coating comprises a third platinum group metal component and a fourth platinum group metal component, wherein the third platinum group metal component and the fourth platinum group metal component are supported on a third oxidic support material, and wherein the third platinum group metal component is different to the fourth platinum group metal component, wherein the second coating is free of an oxygen storage component.

2. The catalyst of claim 1, wherein the first oxygen storage component further comprises one or more of aluminum oxide and zirconium oxide.

3. The catalyst of claim 1, wherein at least 80 weight-% of the first oxygen storage component consist of cerium oxide, calculated as $CeO_2$, and one or more of aluminum oxide, calculated as $Al_2O_3$, and zirconium oxide, calculated as $ZrO_2$, based on the weight of the first oxygen storage component.

4. The catalyst of claim 2, wherein the first oxygen storage component further comprises aluminum oxide.

5. The catalyst of claim 1, wherein the first oxygen storage component further comprises zirconium oxide and one or more of lanthanum oxide and praseodymium oxide.

6. The catalyst of claim 1, further comprising in the first coating a second oxygen storage component different from the first oxygen storage component, said second oxygen storage component comprising cerium oxide.

7. The catalyst of claim 1, wherein the first platinum group metal component, the second platinum group metal component, the third platinum group metal component, and the fourth platinum group metal component independently from each other comprises one more of Ru, Os, Rh, Ir, Pd, and Pt.

8. The catalyst of claim 1, wherein the first oxidic support material and the third oxidic support material independently from each other comprises one or more of alumina, silica, zirconia, titania, lanthana, alumina-zirconia, alumina-silica, alumina-titania, alumina-lanthana, silica-zirconia, silica-titania, silica-lanthana, zirconia-titania, zirconia-lanthana, and titania-lanthana.

9. The catalyst of claim 1, wherein the second oxidic support material comprises, preferably consists of, one or more of alumina, zirconia, lanthana, alumina-zirconia, alumina-lanthana, zirconia-lanthana, and alumina-zirconia-lanthana.

10. The catalyst of claim 1, wherein the weight ratio of the third platinum group metal component to the fourth platinum group metal component is in the range of from 1:1 to 20:1.

11. The catalyst of claim 1, further comprising in the first coating a fifth platinum group metal component supported on a zeolitic material.

12. The catalyst of claim 11, wherein the zeolitic material has a framework type selected from the group consisting of AEL, AFO, BEA, CHA, FAU, FER, HEU, GIS, GME, LEV, LTA, MOR, MTT, MEL, MFS, MFI, MWW, OFF, RRO, SZR, TON, USY, a mixture of two or more thereof and a mixed type of two or more thereof.

13. A process for preparing a catalyst, preferably a catalyst according to claim 1, the process comprising (a) providing a substrate comprising an inlet end, an outlet end, a substrate axial length extending from the inlet end to the outlet end of the substrate and a plurality of passages defined by internal walls of the substrate extending therethrough, and a first slurry comprising water, a first platinum group metal component supported on a first oxidic support material, a second platinum group metal component supported on a second oxidic support material, wherein the first platinum group metal component is different to the second platinum group metal component, a first oxygen storage compound;

(b) disposing the first slurry on the internal walls of the substrate from the inlet end toward the outlet end over at least 50% of the substrate axial length; obtaining a substrate having a first coating disposed thereon;

(c) optionally drying of the substrate having a first coating disposed thereon obtained in (b) in a gas atmosphere;

(d) calcining of the substrate having a first coating disposed thereon obtained in (b), or (c), in a gas atmosphere, obtaining a calcined substrate having a first coating disposed thereon;

(e) providing a second slurry comprising water, a third platinum group metal component and a fourth platinum group metal component, wherein the third platinum group metal component and the fourth platinum group metal component are supported on a third oxidic support material, wherein the third platinum group metal component is different to the fourth platinum group metal component;

(f) disposing the second slurry on the substrate having a first coating disposed thereon from the outlet end toward the inlet end the substrate over at least 50% of the substrate axial length;

obtaining a substrate having a first and a second coating disposed thereon;

(g) optionally drying of the substrate having a first and a second coating disposed thereon obtained in (f) in a gas atmosphere;

(h) calcining of the substrate having a first and a second coating disposed thereon obtained in (f), or (g), in a gas atmosphere; obtaining the catalyst.

14. A catalyst for the treatment of a diesel exhaust gas obtainable or obtained by a process according to claim 13.

15. A method for the treatment of an exhaust gas of a diesel combustion engine, comprising providing an exhaust gas from a diesel combustion engine and passing said exhaust gas through a catalyst according to claim 1.

16. Method of using a catalyst according to claim 1 for the treatment of an exhaust gas of a diesel combustion engine, said use comprising passing said exhaust gas through said catalyst.

* * * * *